US009537944B2

(12) United States Patent
Kahn et al.

(10) Patent No.: US 9,537,944 B2
(45) Date of Patent: *Jan. 3, 2017

(54) METHOD AND APPARATUS FOR FILE SHARING OF MISSING CONTENT BETWEEN A GROUP OF USER DEVICES IN A PEER-TO-PEER NETWORK

(71) Applicant: The DIRECTV Group, Inc., El Segundo, CA (US)

(72) Inventors: Raynold M. Kahn, Los Angeles, CA (US); Romulo Pontual, Palos Verdes, CA (US); Robert G. Arsenault, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 541 days.

This patent is subject to a terminal disclaimer.

(21) Appl. No.: 13/721,655

(22) Filed: Dec. 20, 2012

(65) Prior Publication Data

US 2013/0117379 A1 May 9, 2013

Related U.S. Application Data

(63) Continuation of application No. 11/876,832, filed on Oct. 23, 2007, now Pat. No. 8,345,869, which is a (Continued)

(51) Int. Cl.
*H04K 1/00* (2006.01)
*H04L 29/08* (2006.01)
(Continued)

(52) U.S. Cl.
CPC ............. *H04L 67/104* (2013.01); *H04N 7/20* (2013.01); *H04N 21/2347* (2013.01);
(Continued)

(58) Field of Classification Search
CPC ............. H04L 67/104; H04N 21/4405; H04N 21/2347; H04N 21/4622; H04N 21/4408; H04N 21/6143
(Continued)

(56) References Cited

U.S. PATENT DOCUMENTS

2003/0204851 A1* 10/2003 Powell et al. ................... 725/63
2012/0174167 A1* 7/2012 Walters et al. ................. 725/89

OTHER PUBLICATIONS

Notice of Allowance dated Dec. 10, 2012 in U.S. Appl. No. 11/786,103, filed Apr. 11, 2007 by Raynold M. Kahn et al.
(Continued)

*Primary Examiner* — Mohammad W Reza
(74) *Attorney, Agent, or Firm* — Harness, Dickey & Pierce, PLC

(57) ABSTRACT

A communication system includes a first user device and a group of user devices. A peer-to-peer network is formed from the group of user devices and the first user device. A content request is communicated to the group of user devices through a terrestrial network. At least one of the group of user devices communicates the media content file corresponding to the content request to the first user device through the peer-to-peer network. The media content file communicated to the first user device from at least one of the group of user devices comprises a missing portion of the media content file.

33 Claims, 14 Drawing Sheets

Related U.S. Application Data continuation-in-part of application No. 11/786,103, filed on Apr. 11, 2007, now Pat. No. 8,417,939.

(51) Int. Cl.
- *H04N 7/20* (2006.01)
- *H04N 21/2347* (2011.01)
- *H04N 21/266* (2011.01)
- *H04N 21/4405* (2011.01)
- *H04N 21/4408* (2011.01)
- *H04N 21/462* (2011.01)
- *H04N 21/4788* (2011.01)
- *H04N 21/61* (2011.01)

(52) U.S. Cl.
CPC ... *H04N 21/26613* (2013.01); *H04N 21/4405* (2013.01); *H04N 21/4408* (2013.01); *H04N 21/4622* (2013.01); *H04N 21/4788* (2013.01); *H04N 21/6143* (2013.01)

(58) Field of Classification Search
USPC .......................................................... 380/228
See application file for complete search history.

(56) References Cited

OTHER PUBLICATIONS

EPO summons to oral proceedings dated Apr. 23, 2015 in European Patent Application No. 08827108.5 filed Apr. 11, 2008 by David N. Schlacht et al.

\* cited by examiner

METHOD AND APPARATUS FOR FILE SHARING OF MISSING CONTENT BETWEEN A GROUP OF USER DEVICES IN A PEER-TO-PEER NETWORK

CROSS-REFERENCE TO RELATED APPLICATIONS

This application is a continuation of U.S. patent application Ser. No. 11/876,832 filed on Oct. 23, 2007, which is a continuation-in-part of U.S. patent application Ser. No. 11/786,103, filed on Apr. 11, 2007. The disclosure(s) of the above application(s) is (are) incorporated herein by reference.

TECHNICAL FIELD

The present disclosure relates to a content delivery system and, more specifically, to a content delivery system that file shares content through a peer-to-peer network.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Customers may be billed a monthly subscription fee for access to a channel or group of channels, or a pay-per-view fee for access to individual programs. Access is provided using signals broadcast over the satellite. Once access is provided the user can access the particular content. The broadcasting of a large selection of channels and pay-per-view programs uses a considerable amount of satellite resource.

Content providers are increasingly trying to determine additional ways to provide content to users. Some content may be desired by a small number of customers. In such a case using valuable satellite resources may not be cost-effective.

Additionally, to reduce piracy, broadcast and/or delivery systems and media players require methods to ensure secure authorization, secure content delivery and secure content storage.

SUMMARY

The present invention allows content or portions of content to be downloaded from various sources and stored in the memory of a set top box or other device. Missing portions may be requested and received through a peer-to-peer network. Permissions are obtained through the satellite or through a terrestrial network.

In one aspect of the disclosure, a method of delivering content to a first user device separate from a group of user devices includes receiving a media content file at the group of user devices from a satellite, communicating a media content file request from the first user device to the group through a terrestrial network and receiving the media content file corresponding to the media content file request at the first user device from at least one of the group of user devices through a peer-to-peer network wherein the media content file communicated to the first user device from at least one of the group of user devices comprises a missing portion of the media content file.

In a further aspect of this disclosure, a communication system includes a group of user devices. A peer-to-peer network is formed from the group of user devices and the first user device. A content request is communicated to the group of user devices through a terrestrial network. At least one of the group of user devices communicates the media content file corresponding to the content request to the first user device through the peer-to-peer network. The media content file communicated to the first user device from at least one of the group of user devices comprises a missing portion of the media content file.

One use of the system may be to communicate content that is missing at a user device due to technical or delivery problems. Such missing content may be a short portion of a satellite broadcast program that was not received by the user device due to a brief rain outage. Such missing content may also comprise the starting portion of a program, where the first user device started receiving a broadcast program that was already in progress. Such missing content may also comprise a complete program that was not recorded at broadcast time but is later desired for viewing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
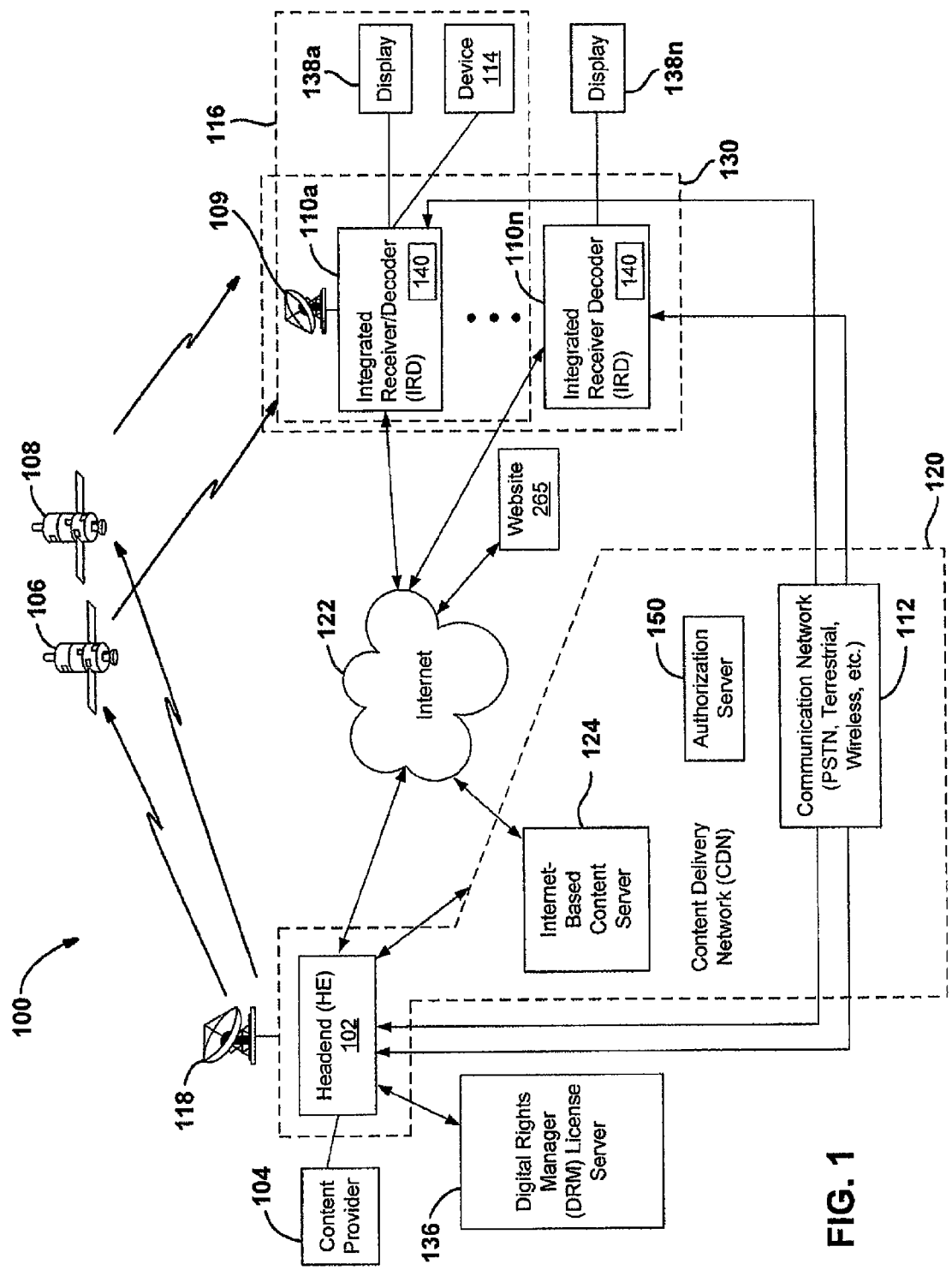
FIG. 1 is a schematic illustration of an example disclosed content delivery system.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

As illustrated in FIG. 1, an example of a communication system 100 includes a head end (HE) 102 that is used as a transmission source, a plurality of content providers, one of which is shown at reference numeral 104 and a first satellite 106. A second satellite 108 may also be incorporated into the system. The satellites 106, 108 may be used to communicate different types of information or different portions of various contents from the head end 102. The system 100 also includes a plurality of user devices such as integrated receiver/decoders (IRDs) 110a-n. Wireless communications are exchanged between the head end 102 and the integrated receiver decoders 110a-n through one or more of the satellites 106, 108. The wireless communications may take place at any suitable frequency, such as, for example, Ka band and/or Ku-band frequencies.

In addition to communication via the satellites 106, 108, various types of information such as security information, encryption-decryption information, content, or content portions such as crucial portions and non-crucial portions may be communicated terrestrially. A communication network 112 such as the public switched telephone network (PSTN), a terrestrial wireless system, stratospheric platform, an optical fiber, or the like may be used to terrestrially communicate.

Information or content provided to the HE 102 from the media source 104 may be transmitted, for example, via an uplink antenna 118 to the satellite(s) 106,108, one or more of which may be a geosynchronous or geo-stationary satellite, that, in turn, rebroadcast the information over broad geographical areas on the earth that include the IRDs 110a-n. Among other things, the example HE 102 of FIG. 1 provides program material to the IRDs 110a-110n and coordinates with the IRDs 110a-n to offer subscribers pay-per-view (PPV) program services and broadband services, including billing and associated decryption of video programs. Non-PPV (e.g. free or subscription) programming may also be received. To receive the information rebroadcast by satellites 106, 108, each IRD 110 is communicatively coupled to a receiver or downlink antenna 109.

Security of assets broadcast via the satellites 106, 108 may be established by applying encryption and decryption to assets during content processing and/or during broadcast (i.e., broadcast encryption). For example, an asset can be encrypted based upon a control word (CW) known to the HE 102 and known to the IRDs 110a-110n authorized to view and/or playback the asset. In the illustrated example communication system 100, for each asset the HE 102 generates a control word packet (CWP) that includes, among other things, a time stamp, authorization requirements and an input value for generating the control word, and then determines the control word (CW) for the asset by computing a cryptographic hash of the contents of the CWP. The CWP is also broadcast to the IRDs 110a-110n via the satellites 106, 108. IRDs 110a-110n authorized to view and/or playback the broadcast encrypted asset will be able to correctly determine the CW by computing a cryptographic hash of the contents of the received CWP. If an IRD 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

In the illustrated example, communication system 100, content, content portion or other information from the media source 104 may also be transmitted from the HE 102 to the IRDs 110a-110n via a content delivery network (CDN) 120. The HE 102 may be part of the content distribution network 120 as illustrated by the dashed lines. The elements within the CDN 120 may interact to communicate content or other information to the user devices such as IRDs 110. Information or content may be transmitted through the head end 102, the servers 124 or combinations of both. In addition, the communication network 112 may also be used in the communication. The communication network 112 may also be part of the content delivery network 120. In one example of FIG. 1, the CDN 120 receives programs/information (e.g., an asset file containing a movie) from the HE 102 and makes the programs/information available for download to the IRDs 110a-110n via a terrestrial communication link and/or network, such as, for example, an Internet connection and/or an Internet based network such as, for example, the Internet 122 or communication network 112.

While the Internet 122 is a multipoint to multipoint communication network(s), persons of ordinary skill in the art will readily appreciate that point-to-point communications via any variety of point-to-point communication signals may be made via the Internet 122. For instance, in the example system of FIG. 1, an IRD 110 downloads an asset file from the CDN 120 using any variety of file transfer and/or file transfer protocol. Such file transfers and/or file transfer protocols are widely recognized as point-to-point communications or point-to-point communication signals and/or create point-to-point communication paths, even if transported via a multipoint to multipoint communication network such as the Internet 122. It will be further recognized that the Internet 122 may be used to implement any variety of broadcast system wherein a broadcast transmitter may transmit any variety of data and/or data packets to any number and/or variety of clients and/or receiver simultaneously. Moreover, the Internet 122 may be used to simultaneously provide broadcast and point-to-point communications and/or point-to-point communication signals from any number of broadcast transmitters and/or CDNs 120. Throughout the following discussions, downloading and/or transferring of asset files to an IRD 110 from a CDN 120 are assumed to be performed using point-to-point communications, point-to-point communication signals and/or point-to-point techniques. As discussed above, the Internet 122 is only an example communications network and/or communication media by which such point-to-point communications may be made.

The example CDN 120 of FIG. 1 may be implemented using any of a variety of techniques and/or devices, for instance, a plurality of Linux based servers (e.g., content server 124 only one of which is shown for simplicity connected via wide bandwidth (i.e., high speed) fiber optic interconnections. Each of the content servers 124 are connected to the Internet 122 thereby making it possible for the IRDs 110a-110n to download information or content (e.g., a movie) from the Internet-based content servers 124. In the illustrated example of FIG. 1, the Internet-based content server 124 locally caches the information provided by the HE 102, and an IRD 110 requesting to download information from the CDN 120 and/or the HE 102 may be redirected to a specific Internet-based content server 124 for processing and/or communication load balancing purposes. For example, an Internet uniform resource locator (URL) assigned to a movie may connect an IRD 110 to particular Internet-based content server 124. If the particular server 124 currently has a high communication load, the server 124 may redirect the IRD 110 to another Internet-based content server 124 from which the movie should be downloaded. In the interest of clarity and ease of understanding, throughout this disclosure reference will be made to delivering, downloading, transferring and/or receiving information, video, data, etc. via the CDN 120. However, persons of ordinary skill in the art will readily appreciate that information is actually delivered, downloaded, transferred and/or received via one of the Internet-based content servers 124 included in or associated with the CDN 120.

In the example communication system 100, the CDN 120 may be operated by an external vendor (i.e., the CDN 120 need not be operated by the operator of the HE 102). To download files from the CDN 120, the IRDs 110a-110n implement, for instance, an Internet protocol (IP) stack with a defined application layer and possibly a download application provided by the CDN vendor. In the illustrated example, file transfers are implemented using standard Internet protocols (e.g., file transfer protocol (FTP), hypertext transfer protocol (HTTP), etc.). Each file received by an IRD 110 is checked for completeness and integrity and, if a file is not intact, missing and/or damaged portion(s) of the file are delivered and/or downloaded again. Alternatively, the entire file is purged from the IRD 110 and/or is delivered and/or downloaded again.

To facilitate the downloading and transfer of various content, a peer-to-peer network 130 may be temporarily (or permanently) set up between various groups of user devices such as IRDs 110a-n. The groups of user devices may each receive a portion of a particular content directly from a server. The content may be exchanged until each of the members of the network 130 receives the complete content. Thereafter, the network may be dissolved. Various security aspects and method used in the establishment of the peer-to-peer network 130 are described in detail below.

Security of assets available via the CDN 120 may be established by the broadcast encryption applied to an asset before the asset is provided to the CDN 120 or peer-to-peer network 130 and, thus, the CDN 120 or peer-to-peer network 130 is not necessarily required to apply encryption and/or encoding to an asset. For example, the HE 102 may provide to the CDN 120 the CWP(s) for each broadcast encrypted asset provided to the CDN 120. The CDN 120 then downloads the CWP(s) for the asset to an IRD 110 such that, if the IRD 110 is authorized to view and/or playback the asset, the IRD 110 may correctly determine the CW(s) used to broadcast encrypt the asset. In this way, the authorization to view assets downloaded via the CDN 120 is performed in substantially the same fashion as that performed for live and non-live assets broadcast via the satellites 106, 108. If the security of an asset at the CDN 120 is known by the CDN 120 and/or the HE 102 to be compromised, the HE 102 and/or the CDN 120 make the compromised version of the file unavailable (e.g., by purging the file at the CDN 120) for download by other IRDs 110a-110n until the compromised asset is replaced by the HE 102.

In another example, the CDN 120 first verifies that an IRD 110 is authorized to download a file before the CDN 120 allows the IRD 110 to download the file (i.e., the CDN 120 implements a conditional access scheme). Authorization verification may be performed using any of a variety of techniques. In one embodiment, all authorized IRDs 110a-110n utilize a shared secret or password that allows access to the CDN 120. In particular, the CDN 120 can utilize the shared secret or password to verify that an IRD 110 is authorized to download assets by, for example, comparing the value of or a value representing the shared secret sent by the IRD 110 to the CDN 120 with the current shared secret or password. If the two match, then the IRD 110 is authorized to download the asset. The shared secret or password is neither asset nor IRD 110 specific and is, thus, preferably updated and/or changed frequently (e.g., every minute) and broadcast via the satellites 106, 108 to all authorized IRDs 110a-110n. Further, a security function (e.g., a cryptographic hash) could be applied to all or a portion of an asset's URL based on the changing shared secret or password. Preferably, to enhance security, an asset's scrambled URL is at least partially not human readable.

As discussed below, the CDN may alternatively or additionally, apply encryption to an asset. For example, an asset may be additionally encrypted (i.e., super-encrypted) by the CDN 120 such that only one of the IRDs 110a-110n is able to decrypt the asset. Further, the additionally applied encryption may implement the additional copy protection encryption that may have been applied by an IRD 110 prior to storage of an asset within the IRD 110.

Example devices 114 coupled to the IRD 110 include a personal computer (PC), a portable media player, a media extender, a game playing system, a media client, etc. As illustrated in FIG. 1, the devices 114 may connect directly to an IRD 110 via any parallel or serial communication system, such as, for example, universal serial bus (USB) connectivity, Institute of Electrical and Electronics Engineers (IEEE) 1394 (a.k.a., Firewire), or via a home network 116. To support import and/or export of secure program material between devices 114 that support any variety of Digital Rights Management (DRM) system and an IRD 110, the example HE 102 of the illustrated example of FIG. 1 is communicatively coupled to a DRM license server 136. An example DRM system is implemented in accordance with the Microsoft® Windows Media®—DRM specification.

The example system 100 of FIG. 1 may include a plurality of satellites 106, 108 to provide wide terrestrial coverage, to provide additional channels and/or to provide additional bandwidth per channel. For example, each satellites 106, 108 may include 16 transponders to receive program material and/or other control data from the HE 102 and to rebroadcast the program material and/or other control data the IRDs 110a-110n. However, using data compression and multiplexing techniques, multiple satellites 106, 108 working together can receive and rebroadcast hundreds of audio and/or video channels.

In addition to the delivery of live content (e.g., a TV program) and/or information, the example HE 102 of FIG. 1 is capable of delivering, among other things, a file via the uplink antenna 118, which broadcasts the information via the satellites 106, 108 to the IRDs 110a-110n. The file may contain any of a variety of media content types, for instance, audio or video program data (e.g., a movie, a previously recorded TV show, a music video, etc.), control data (e.g., software updates), data service information or web pages, software applications, or program guide information. In the example system 100 the delivery of a file generally includes: (a) binding network addresses to hardware locations, (b) announcing the file and (c) delivering the file. The binding of network addresses to hardware locations allows for files to be sent and received via ubiquitous network addresses, for example, an IP address and IP port number. Announcing the delivery of the file, allows the IRDs 110a-110n to rendezvous with a file broadcast via the satellites 106, 108 at a pre-determined time at the network address to download the file. In particular, announcements describe, in advance, when and how individual files will be delivered. They contain sufficient information about these files to allow the IRDs 110a-110n to determine whether or not to download one or more of the files. To download a file, an IRD 110 joins an IP multicast group at an IP address and pre-determined time specified in an announcement. The IRD 110 reassembles the data file from the data transmitted to the IP multicast group as received via the receiver (i.e., downlink) antenna 109.

As illustrated in FIG. 1, the example pay content delivery system 100 has two primary data and/or information delivery mechanisms: (a) wireless via the satellites 106, 108 and (b) via the CDN 120 (e.g., Internet-based delivery). Content delivery may be implemented using a wireless broadband connection (e.g., Institute of Electrical and Electronics Engineers (IEEE) 802.16 (a.k.a. WiMAX), 802.11b, 802.11g, etc.), a broadband wired connection (e.g., Asymmetric Digital Subscriber Line (ADSL), cable modems, etc.) or, albeit at potentially a slower speed, using a modem connected to a conventional public switched telephone network (PSTN).

In the illustrated example of FIG. 1, wireless delivery via the satellites 106, 108 may simultaneously include both files (e.g., movies, pre-recorded TV shows, games, software updates, asset files, etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 120 can support a large number of titles, each of which may have a narrower target audience. Further, Internet-based delivery is point-to-point (e.g., from an Internet-based content server 124 to an IRD 110) thereby allowing each user of an IRD 110 to individually select titles. Peer-to-peer networks may also be established to distribute content. In the illustrated example of FIG. 1, allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 120 when the size of the target audience or the demand for the title is smaller. A title may simultaneously be broadcast via the satellites 106, 108 and be made available for download from the CDN 120 via the Internet 122.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 120 for download via the CDN 120 (i.e., Internet-based delivery). In particular, if the data file is broadcast via the satellites 106, 108, the data file forms at least one payload of a resultant satellite signal. Likewise, if the data file is available for download via the CDN 120, the data file forms at least one payload of a resultant Internet signal.

It will be readily apparent to persons of ordinary skill in the art that even though the at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

In the illustrated example of FIG. 1, the same pre-packetized and, optionally, pre-encrypted, content data file that is broadcast via satellite may be available for download via Internet, and how the asset is stored, decoded and/or played back by the IRD 110 is independent of whether the program was received by the IRD 110 via satellite or Internet. Further, because the example HE 102 of FIG. 1 broadcasts a live program and a non-live program (e.g., a movie) by applying the same encoding, packetization, encryption, etc., how a program (live or non-live) is stored, decoded and/or played back by the IRD 110 is also independent of whether the program is live or not. Thus, an IRD 110 may handle the processing of content, programs and/or titles independent of the source(s) and/or type(s) of the content, programs and/or titles. In particular, example delivery configurations and signal processing for the example content delivery system of FIG. 1 are discussed in detail below.

As described below in conjunction with FIGS. 4, 5 and 6, the IRD 110 may be one of any variety of devices, for example, a set-top box, a home media server, a home media center (HMC), a personal computer (PC) having a receiver card installed therein, etc. Display devices 138*a-n* such as a television set, a computer monitor, a portable media player or the like are coupled to the IRD 110 for displaying and/or playback of received programming. Additionally, each IRD 110 may include a recorder 140 and/or any variety of circuits, modules and/or devices collectively implementing recorder functionality used to record content received by the IRD 110. The recorder 140 may be, for example, a device capable of recording information on, for instance, analog media such as videotape or computer readable digital media such as a hard disk drive (HDD), a digital versatile disc (DVD), a compact disc (CD) and/or any other suitable media.

Each IRD 110 may connect to the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc.

The content delivery network 120 may also include an authorization server 150 that is used to provide authorizations such as encryption/decryption keys, password and the like to the IRDs 110. It should be noted that although the servers 124 and 150 are illustrated as separate elements, they may be incorporated physically within HE 102.

Figure 2:
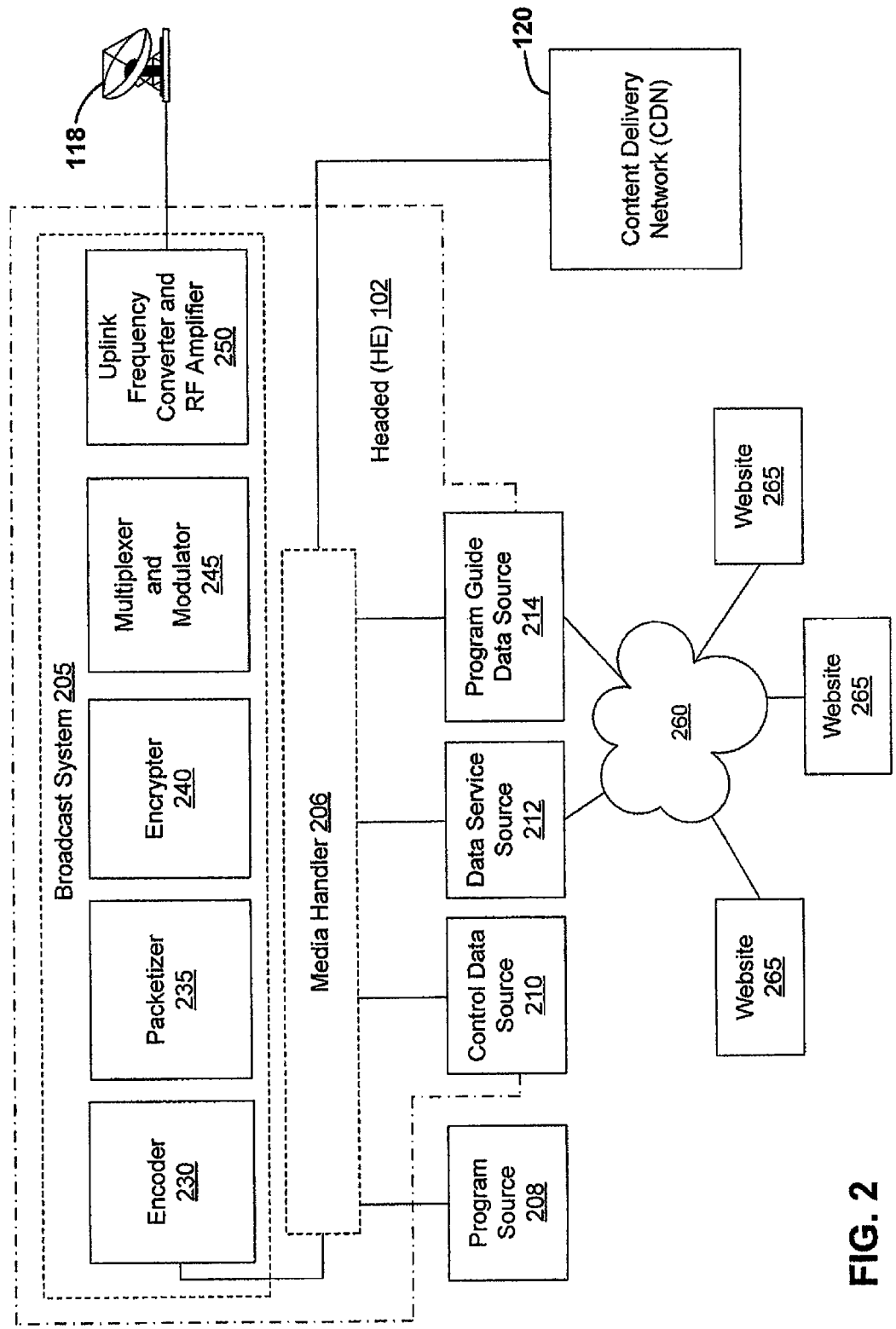
FIGS. 2 and 3 illustrate example manners of implementing the example head end (HE) of FIG. 1.

FIG. 2 illustrates an example manner of implementing the HE 102 of FIG. 1. The example HE 102 of FIG. 2 includes a broadcast system 205, a media handler 206 and a plurality of media sources that provide content, data and/or information (e.g., program sources 208, a control data source 210, a data service source 212, and one or more program guide data sources 214). As illustrated in FIG. 2, the data sources 210, 212 and/or 214 may be implemented partially or wholly by the HE 102 depending upon an implementation of the HE 102. The example broadcast system 205 and the uplink antenna 118 form a satellite broadcast transmitter. An example media handler 206 is discussed in more detail below in connection with FIG. 3. In one example, information (e.g., files, bitstreams, etc.) from one or more of the sources 208-214 is passed by the media handler 206 to an encoder 230. In the illustrated example of FIG. 2, the encoder 230 encodes the data according to the CableLabs® Video-on-Demand (VoD) encoding specification MD-SP-VOD-CEP-I01-040107 (i.e., performs asset encoding). The encoded data is then packetized into a stream of data packets by a packetizer 235 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by an encrypter 240 using, for example, the well-known Advanced Encryption Standard (AES) or the well-known Data Encryption Standard (DES). In an example, only the payload portion of the data packets are encrypted thereby allowing an IRD 110 to filter, route and/or sort received broadcast encrypted data packets without having to first decrypt the encrypted data packets. To facilitate broadcast of the encrypted bitstream, the encrypted bitstream passes from the encrypter 240 to a multiplexer and modulator 245 that, using any of a variety of techniques, multiplexes any number of encrypted bitstreams together and then modulates a carrier wave with the multiplexed encrypted bitstreams. The modulated carrier wave is then passed to any variety of uplink frequency converter and radio frequency (RF) amplifier 250, which, using any of a variety of techniques, converts the modulated carrier wave to a frequency band suitable for reception by the satellites 106, 108 and applies appropriate RF amplification. The up-converted and amplified signal is then routed from the uplink frequency converter 250 to the uplink (i.e., transmit) antenna 118 where it is transmitted towards the satellites 106, 108.

While a particular broadcast system 205 is illustrated in FIG. 2, persons of ordinary skill in the art will readily appreciated that broadcast systems may be implemented using any of a variety of other and/or additional devices, components, circuits, modules, etc. Further, the devices, components, circuits, modules, elements, etc. illustrated in FIG. 2 may be combined, rearranged, eliminated and/or implemented in any of a variety of ways. For example, multiplexing of the packetized data may be performed prior to encryption of the data packets by the example encrypter 240. In such an example configuration, the encrypter 240 is configurable to selectively encrypt data packets based upon which data packet stream (e.g., media source) they are associated with.

As discussed above, content, data and/or information provided by the sources 208-214 may be live, real time and/or non-real time. For example, a first program source 208 may provide a live TV program while a second program source 208 provides a previously recorded title (e.g., a movie, a music video, etc.). In the illustrated example of FIG. 2, if a movie provided by the second program source 208 is pre-encoded, pre-packetized and pre-encrypted, the movie may be provided by the media handler 206 directly to the example multiplexer/modulator 245. In particular, the example broadcast system 205 of FIG. 2 may be implemented and/or operated to broadcast both live and/or real time data and/or information and non-real time data and/or information. In the illustrated example of FIG. 2, the operation and/or implementation of the multiplexer/modulator 245 and the uplink frequency converter/RF amplifier 250 are agnostic to whether the broadcast represents real time or non-real time data and/or information. Further, the format and/or structure of the payload of the signal being broadcast toward the satellites 106, 108 by the broadcast system 205 and the transmit (i.e., uplink) antenna 118 and the received by the IRD 110 does not depend on whether the data and/or information is real time or non-real time. Moreover, an output of, for example, the example packetizer 235 and/or the example encrypter 240 of FIG. 2 may be captured and/or recorded by the media handler 206 to, for example, an asset file. Like other asset files created by the media handler 206, the example media handler 206 may provide such asset files to the CDN 120 for transfer to an IRD 110 via the Internet 122 and/or broadcast the asset file via the satellites 106, 108. In this way, the broadcast system 205 may implement functionality similar and/or identical to the example video transport processing system (VTPS) 320 discussed below in connection with FIG. 3.

As discussed above in connection with FIG. 1, the example HE 102 may provide programs (e.g., movies, games, pre-recorded TV shows, and other content) to the CDN 120 for delivery to an IRD 110. In particular, the example media handler 206 of FIG. 2 may provide a pre-encoded, pre-packetized and, optionally, pre-encrypted bitstream to the CDN 120. Further, in the illustrated example HE 102 of FIG. 2 and/or, more generally, the system 100 of FIG. 1, how a title is pre-encoded, pre-packetized and, optionally, pre-encrypted does not depend upon whether the title will be broadcast via a satellites 106, 108 or made available for download via the CDN 120.

The program sources 208 receive video and audio programming from a number of sources, including satellites, terrestrial fiber optics, cable, or tape. The video and audio programming may include, but is not limited to, television programming, movies, sporting events, news, music or any other desirable content. The program sources 208 may provide the video and audio programming in the form of, for example, a bitstream or a file.

The control data source 210 passes control data to the media handler 206 such as, for example, data representative of a list of SCIDs to be used during the encoding process, or any other suitable information.

The data service source 212 receives data service information and web pages made up of data files, text files, graphics, audio, video, software, etc. Such information may be provided via a network 260. In practice, the network 260 may be the Internet 122, a local area network (LAN), a wide area network (WAN), a PSTN, etc. The information received from various sources is compiled by the data service source 212 and provided to the media handler 206. For example, the data service source 212 may request and receive information from one or more websites 265. The information from the websites 265 may be related to the program information provided to the media handler 206 by the program sources 208, thereby providing additional data related to programming content that may be displayed to a user at an IRD 110.

The program guide data source 214 provides information that the IRDs 110a-110n use to generate and display a program guide to a user, wherein the program guide may be a grid guide that informs the user of particular programs that are available on particular channels at particular times. The program guide also includes information that an IRD 110 uses to assemble programming for display to a user. For example, if the user desires to watch a baseball game on his or her IRD 110, the user will tune to a channel on which the game is offered. The program guide contains information required by an IRD 110 to tune, demodulate, demultiplex, decrypt, depacketize and/or decode selected programs.

Figure 3:
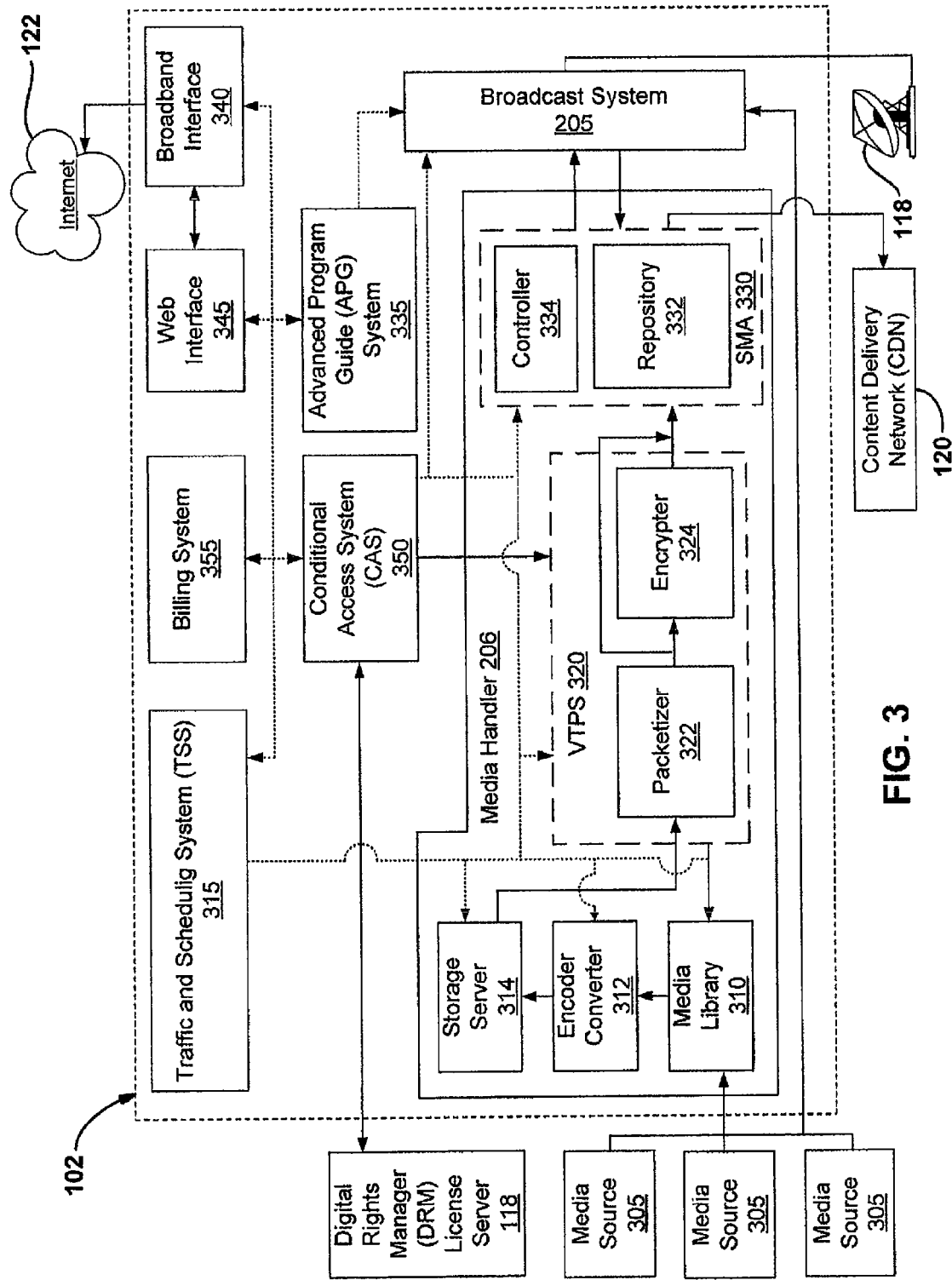

FIG. 3 illustrates another example manner of implementing the HE 102 of FIG. 1 and, in particular, an example manner of implementing the media handler 206 of FIG. 2. While a particular HE 102 and media handler 206 are illustrated in FIG. 3, persons of ordinary skill in the art will readily appreciated that head ends and/or media handlers may be implemented using any of a variety of other and/or additional devices, components, circuits, modules, etc. Further, the devices, components, circuits, modules, elements, etc. illustrated in FIG. 3 may be combined, rearranged, eliminated and/or implemented in any of a variety of ways. The example HE 102 of FIG. 3 receives live or non-live video content (e.g., movies, TV shows, sporting events, etc.) from a plurality of media sources 305. The media sources 305 may be, for example, any of the sources 208-214 discussed above in connection with FIG. 2. The media sources 305 deliver content to the HE 102 via any of a variety of techniques, for example, satellite, tape, CD, DVD, file transfer, etc. For instance, a media source 305 first performs encoding and packaging of an asset and then transmits the packaged asset via satellite to the HE 102. The HE 102 receives the packaged asset and checks to ensure the asset was delivered in its entirety without corruption. If the asset was not correctly received, the HE 102 can request re-transmission. To store the received assets (packaged or not), the example media handler 206 of FIG. 3 includes a media library 310. As illustrated in FIG. 3, live assets (e.g., a live TV program) can be routed directly from a media source 305 to the broadcast system 205 for broadcast via the satellites 106, 108 to the IRDs 110a-110n. Live assets may, alternatively or additionally, be recorded in a media library 310 and then converted to a pre-encoded, pre-packetized and, optionally, pre-encrypted distribution files as discussed below.

In the illustrated example HE 102 of FIG. 3 and the example pay content delivery system 100 of FIG. 1, video content (i.e., video assets) are encoded and packaged according to the CableLabs® specification for VoD content. To pre-encode and pre-package received video assets that are not received pre-encoded and pre-packaged according to the CableLabs® specification for VoD content, the example media handler 206 of FIG. 3 includes an encoder/converter 312. The example encoder/converter 312 of FIG. 3 either pre-encodes an un-encoded received asset or converts/re-encodes an asset that is encoded based on another specification and/or standard. For example, an asset received via tape will require pre-encoding and pre-packaging. To store the properly pre-encoded and pre-packaged assets, the illustrated example media handler 206 includes a storage server 314.

To pre-packetize the pre-encoded asset to one of any variety of formats suitable for distribution (e.g., an asset file) and, optionally, to pre-encrypt the asset file, the example media handler 206 of FIG. 3 includes a content transport processing system such as, for example, for video content the VTPS 320 comprising a packetizer 322 and an encrypter 324. Of course, other types of content transport processing systems may be included for other types of content data. Additionally or alternatively, a single content transport processing system capable to process multiple types of content data may be implemented. Among other things, the example packetizer 322 of FIG. 3 pre-packetizes the pre-encoded asset. The example encrypter 324 of FIG. 3 pre-encrypts the pre-packetized stream according to, for example, either the AES or the DES standard. The control word (CW) used to broadcast encrypt the pre-packetized asset is determined, as described above, by a conditional access system (CAS) 350. In the illustrated example HE 102 of FIGS. 1 and 3, an asset file contains pre-encoded pre-packetized and, optionally, pre-encrypted video data. Additionally or alternatively, as discussed above in connection with FIG. 2, outputs of the broadcast system 205 (e.g., an output of the packetizer 235 and/or the encrypter 240) may be used to create pre-packetized and/or pre-encrypted assets. For example, such outputs of the broadcast system 205 may be used to, for example, create asset files for live programs currently being broadcast by the HE 102. That is, the broadcast system 205 may be used, in addition to broadcast live and non-live programs, to implement a VTPS, VTPS functionality and/or functionality similar to the VTPS 320. The example media handler 206 can handle asset files created by the VTPS 320 identically to those created from outputs of the broadcast system 205. To store asset files, the example media handler 206 of FIG. 3 includes a service management and authoring system (SMA) 330.

It will be readily apparent to persons of ordinary skill in the art that content processing, that is, the processes of pre-encoding, pre-packetizing and, optionally, pre-encrypting assets to form asset files may be performed in non-real time. Preferably, content processing is implemented as an automated workflow controlled by a traffic and scheduling system (TSS) 315. In particular, the TSS 315 can schedule content processing for a plurality of received assets based upon a desired program lineup to be offered by the example Direct-to-Home (DTH) system 100 of FIG. 1. For example, a live TV program for which a high demand for reruns might be expected could be assigned a high priority for content processing.

In the illustrated example of FIG. 3, the SMA 330 implements a store and forward system. That is the SMA 330 stores all asset files (i.e., distribution files) until they are scheduled to be broadcast via satellite and/or scheduled to be transferred to the CDN 120. In the example HE 102 of FIGS. 1-3, an asset is stored using the same distribution file format regardless of how the asset is to be delivered to the IRDs 110a-110n. This enables the same assets to be forwarded to the IRDs 110a-110n via the satellites 106, 108 or via the CDN 120. To control the SMA 330 and to store the distribution files, the example SMA 330 includes a controller 334 and a repository 332, respectively. In the illustrated example of FIG. 3, the SMA 330 is controlled by a traffic schedule determined by the TSS 315, that is, the controller 334 operates responsive to commands received from the TSS 315.

For satellite distribution, the SMA 330, as instructed by the TSS 315, sends an asset file to the broadcast system 205 at a scheduled broadcast time. As described above in connection with FIG. 2, the broadcast system 205 transmits the asset file via the transmit (i.e., uplink) antenna 118 and the satellites 106, 108. In particular, since the asset file is already pre-encoded, pre-packetized and, optionally, pre-encrypted, the asset file is only passed through the multiplexer/modulator 245 and the uplink frequency converter/RF amplifier 250 of the example broadcast system 205 of FIG. 2. As also described above, live assets may be encoded, packetized and broadcast encrypted by the broadcast system 205 and will be multiplexed, modulated, up-converted and amplified using the same techniques as that applied to an asset file. In particular, a live program that is broadcast live via the broadcast system 205 results in a satellite signal that is substantially similar to a satellite signal resulting from broadcast of an asset file created from the live program.

In the illustrated example of FIG. 3, a video asset file is sent to the broadcast system 205 as a pre-encoded, pre-packetized and, optionally, pre-encrypted bitstream containing video as well as all audio and conditional access (CA) data in a single file. Video and audio are assigned default SCIDs/PIDs during content processing. The broadcast system 205 may, thus, override the default SCID/PID assignments and may re-stamp SCID/PID data packet header entries with the correct values based on the particular satellite transponder allocated to the asset.

For Internet distribution, the SMA 330, as instructed by the TSS 315, sends an asset file to the CDN 120 at a scheduled time via a dedicated private access line (e.g., a digital signal level 3 (DS-3) communication link, an optical carrier level 3 (OC-3) fiber optic link, etc.) or a secure virtual private network (VPN) link. In the illustrated examples of FIGS. 1-3, the HE 102 sends each asset file to the CDN 120 once and all subsequent copying and distribution of the asset via the Internet 122 is performed by the CDN 120. Asset files received by the CDN 120 are verified to ensure they are received in their entirety and with full integrity. The link between the HE 102 and the CDN 120 has a finite bandwidth and, thus, the TSS 315 schedules delivery of assets to the CDN 120 to ensure that assets are available via the CDN 120 as advertised, for example, in program guide information.

To provide program guide information to the IRDs 110a-110n, the example HE 102 of FIG. 3 includes the advanced program guide (APG) system 335. The APG system 335 creates and/or updates APG data that is broadcast to the IRDs 110a-110n via the broadcast system 205 (i.e., via the satellites 106, 108). Example APG data lists which assets are being broadcast by the HE 102 and are, thus, available for recording by the IRDs 110a-110n. For the listed assets, the APG data specifies a starting time, duration, a network address, a satellite transponder identifier and an SCID/PID set. For assets available for download via the CDN 120, the APG, additionally or alternatively, includes an Internet URL from which an IRD 110 may download the asset.

To schedule content processing, APG data updates as well as content delivery via the broadcast system 205 and/or the CDN 120, the example HE 102 of FIG. 3 includes the TSS 315. For each asset the following dates (i.e., date and time) may be controlled and/or determined by the TSS 315: (a) expected arrival date, (b) start of content processing, (c) end of content processing, (d) APG announcement date (i.e., from which date the asset will be visible to a customer in the APG), (e) broadcast date, (e) CDN publish date, (f) SMA purge date (i.e., date asset is removed from repository 332), (g) end of availability of purchase, (h) end of viewing (i.e., date of purge from an IRD 110), and (i) CDN 120 purge date. The TSS 315 may control other dates as well.

In the example HE 102 of FIG. 3, each live asset is assigned to a broadcast operations control (BOC) channel by the TSS 315 that denotes the physical location of a program (e.g., a satellite transponder). Likewise, the delivery of asset files (i.e., distribution files) via the satellites 106, 108 is also organized by BOC channel. In the illustrated examples of FIGS. 1 and 3, the link between the HE 102 and the CDN 120 is broken up into sub-channels each of which is assigned a BOC channel number. By using BOC channels for both live and non-live assets (even those being broadcast via the CDN 120), the TSS 315 can schedule broadcast and/or delivery of all assets in the same fashion. In particular, the delivery of assets to the CDN 120 is scheduled by the TSS 315 like the broadcast of an asset via the satellites 106, 108 (i.e., by selecting a BOC channel and time). If an example system includes more than one CDN 120, then the CDNs 120 could be assigned distinct BOC channel numbers making the implementation of the TSS 315 easily extendable.

To facilitate backchannel communications between the IRDs 110a-110n and the HE 102, the illustrated example HE 102 includes any of a variety of broadband interfaces 340 that communicatively couples the HE 102 to the IRDs 110a-110n via the Internet 122. As described above, the broadband interface 340 using any of a variety of techniques may realize secure communications between the HE 102 and the IRDs 110a-110n. Alternatively, the broadband interface 340 provides any of a variety of modem interfaces to a PSTN. The broadband interface 340 also facilitates interaction of the IRDs 110a-110n with a web interface 345 and/or the conditional access system (CAS) 350. To allow users of the IRDs 110a-110n to subscribe to services, purchase titles, change preferences, etc., the example HE 102 of FIG. 3 includes the web interface 345. In the illustrated example, the web interface 345 using any of a variety of techniques presents one or more web based interfaces via the Internet 122 and/or any variety of wireless link such as, for example, via the satellites 106, 108 and receives user selections.

The broadband interface 340 also may be used to communicate content or content portions to the IRDs 110. As mentioned above, various IRDs 110 may be grouped together from all the IRDs to form a peer-to-peer network. Portions of the content may be communicated to various IRDs and distributed throughout the peer-to-peer network.

In the example communication system 100 of FIG. 1, users of the IRDs 110a-110n may be restricted from downloading assets from the CDN 120 and/or from decoding or playing back assets received (either via the satellites 106, 108 or the CDN 120) and/or stored by an IRD 110 (i.e., conditional access to content). To authorize an IRD 110 for downloading, decoding and/or playback of an asset, the example HE 102 of FIG. 3 includes the CAS 350. In an example, the CAS 350 generates and broadcasts CWP(s) and determines the CW(s) used to broadcast encrypt each asset. In another example, the CAS 350 receives an authorization request from an IRD 110 via the Internet 122 and the broadband interface 340, and provides an authorization response to the IRD 110 via the broadcast system 205 and the satellites 106, 108. Example interactions between the HE 102, the CAS 350, the IRDs 110a-110n and the CDN 120 and/or methods to conditionally authorize downloading, decoding and/or playback of assets are discussed below.

In the illustrated example of FIG. 1, users of the IRDs 110a-110n are charged for subscription services and/or asset downloads (e.g., PPV TV) and, thus, the example HE 102 of FIG. 3 includes a billing system 355 to track and/or bill subscribers for services provided by the example pay content delivery system 100. For example, the billing system 355 records that a user has been authorized to download a movie and once the movie has been successfully downloaded the user is billed for the movie. Alternatively, the user may not be billed unless the movie has been viewed.

Figure 4:
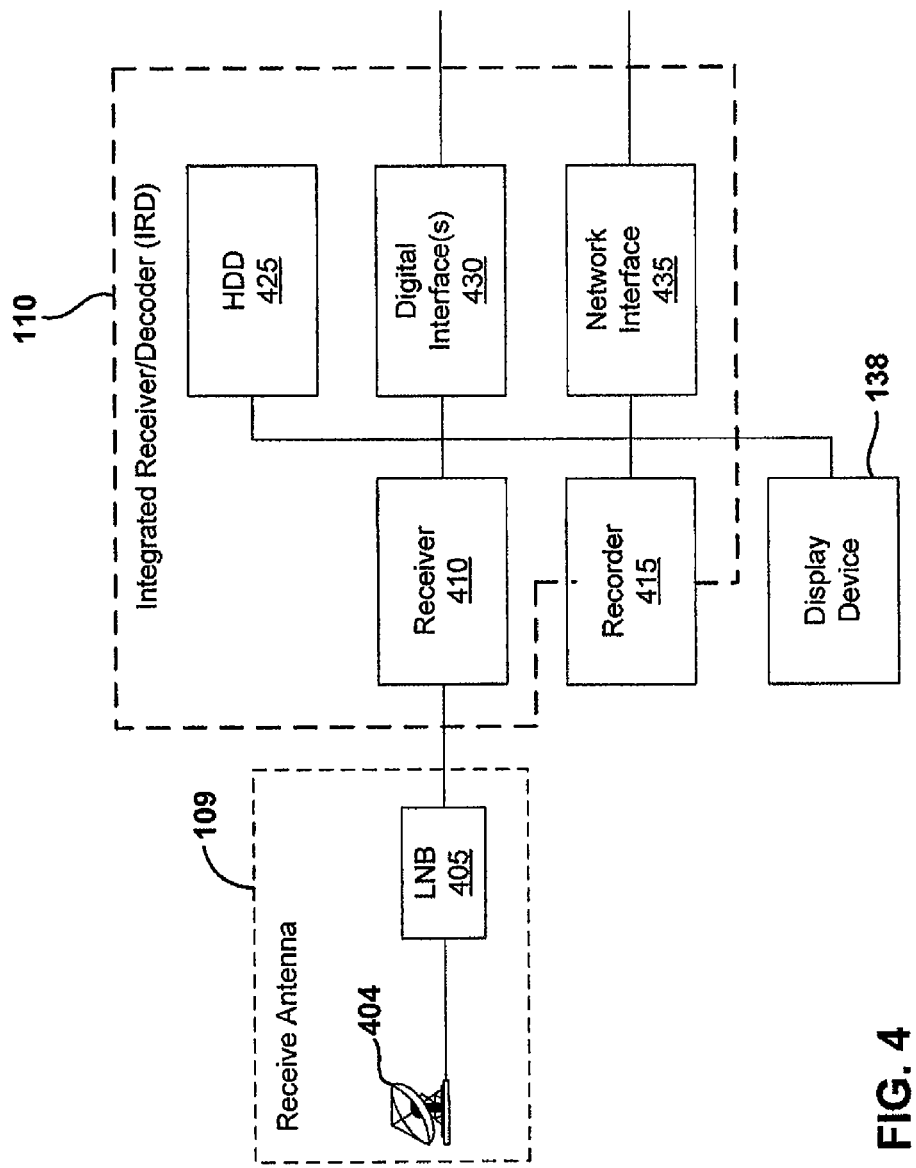
FIGS. 4, 5 and 6 illustrate example manners of implementing the example integrated receiver/decoder (IRD) of FIG. 1.

FIG. 4 illustrates an example manner of implementing the receive antenna 109 and the IRD 110 of FIG. 1. In operation, the receive antenna 109 (i.e., downlink antenna 109) receives signals conveying a modulated multiplexed bitstream from the satellites 106, 108. Within the receive antenna 109, the signals are coupled from a reflector and feed 404 to a low-noise block (LNB) 405, which amplifies and frequency downconverts the received signals. The LNB output is then provided to a receiver 410, which receives, demodulates, depacketizes, demultiplexes, decrypts and decodes the received signal to provide audio and video signals to a display device 138 and/or a recorder 415. As illustrated in FIG. 4, the recorder 415 may be implemented separately from and/or within the IRD 110. The receiver 410 is responsive to user inputs to, for example, tune to a particular program.

To store received and/or recorded programs and/or assets, the example IRD 110 of FIG. 4 includes any of a variety of storage device 425 (e.g., an HDD 425). The HDD 425 is used to store the packetized assets and/or programs received via the satellites 106, 108 and/or the CDN 120. In particular, the packets stored on the HDD 425 may be the same encoded and, optionally, encrypted packets created by the HE 102 and transmitted via the satellites 106, 108 and/or made available for download via the CDN 120. To communicate with any of a variety of clients, media players, etc., the illustrated example IRD 110 includes one or more digital interfaces 430 (e.g., USB, serial port, Firewire, etc.). To communicatively couple the example IRD 110 to, for instance, the Internet 122 and/or the home network 116, the example IRD 110 includes a network interface 435 that implements, for example, an Ethernet interface.

Figure 5:
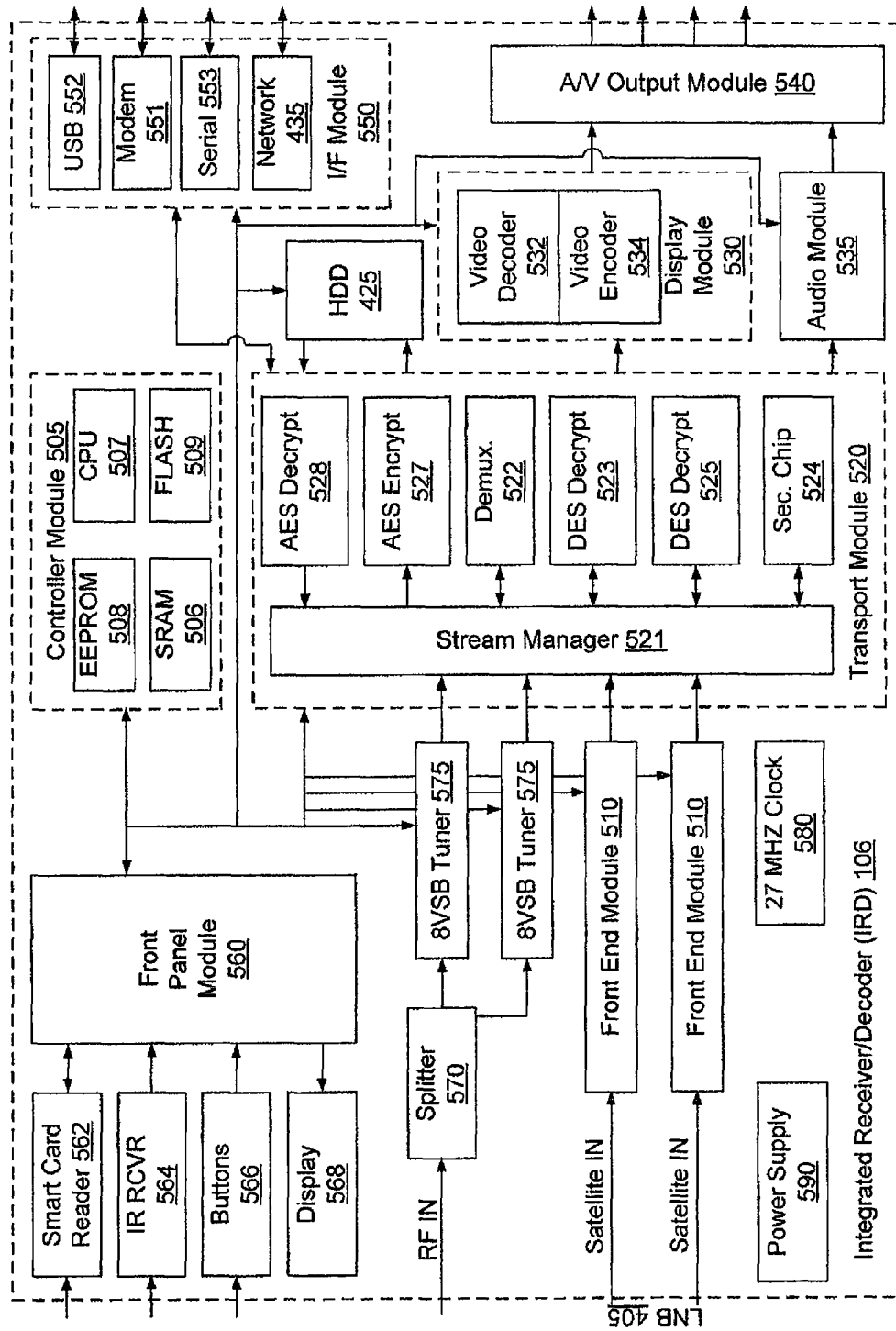

FIG. 5 is an illustration of another example manner of implementing the IRD 110 of FIG. 1. In general, circuitry, modules and/or components inside the IRD 110 receive the L-band RF signals received from the satellites 106, 108 via the LNB 405 (FIG. 4) and convert the signals back into an original digital bitstream. Decoding circuitry, modules and/or components receive the original bitstream and perform video/audio processing operations such as demultiplexing and decompression (i.e., decoding). One or more processor(s), microprocessor(s) or central processing unit(s) (CPU) 507 of a controller module 505 controls the overall operation of the example IRD 110, including the selection of parameters, the set-up and control of components, channel selection, and many other functions of the example IRD 110 of FIG. 5.

Specifically, the example IRD 110 of FIG. 5 includes the controller module 505, front end modules 510, a transport module 520, a display module 530, an audio module 535, and an audio/video (A/V) output module 540, an interface (I/F) module 550, a front panel module 560, a splitter 570, 8VSB tuners 575, a power supply 590 and the HDD 425. As further shown in FIG. 5, a 27 megahertz (MHz) clock signal generator 580 is also provided. The clock generator 580 generates a clock signal that is coupled to various components of the IRD 110 and may be frequency-calibrated by a signal received from the transport module 520.

The example front end modules 510 of FIG. 5 receive the L-band RF signals received from the satellites 106, 108 via the LNB 405 (FIG. 4) and convert the signals back into the original digital bitstream (i.e., stream of encoded and, optionally, encrypted data packets). Among other things, the front end modules 510 implement a tuner, a demodulator and an FEC decoder. Likewise, the splitter 570 of the illustrated example may be coupled to an antenna or a cable or terrestrial broadcast system such as, for example, an analog or digital cable television broadcast system (not shown) to receive information content. Signals from the splitter 570 are coupled to the tuners 575 that implement an Advanced Television Systems Committee (ATSC)/National Television System Committee (NTSC) tuner, an NTSC decoder and a vestigial side band (VSB) demodulator to convert received information into a digital bitstream. The front end modules 510, the splitter 570, and the 8VSB tuners 575 are controlled by the controller module 505 and may be implemented using any of a variety of well-known techniques, devices, circuits and/or components.

The transport module 520 receives the transport stream of digitized data packets containing video, audio, data, scheduling information, data files, and other information. As described above, the data packets contain identifying headers. To route and/or connect data packets and/or bitstreams between various components and/or devices of the transport module 520, the example transport module 520 includes a stream manager 521. In one example, a channel demultiplexer 522, under control of the controller module 505, filters out packets that are not currently of interest, and the stream manager 521 routes the data packets of interest through a DES decryption circuit 523. In the example DTH system 100 of FIG. 1, access control is implemented by any of a variety of techniques. For example, access control may be achieved by broadcast encrypting an asset at the HE 102 based on a CW determined and/or selected by the CAS 350 (FIG. 3), and sending information (e.g., a CWP) containing a CW or containing information from which an IRD 110 may determine the CW such that the asset may be correctly decrypted by the DES decryption circuit 523. In the illustrated example of FIG. 5, determination of a CW from a CWP is performed by a smart card (not shown) based upon, for example, functionality (e.g., a cryptographic hash function) implemented by the smart card (not shown) and/or security data stored in the smart card and accessed via a smart card reader 562 associated with the front panel module 560. In the illustrated example of FIG. 5, secure insertion of the CW from the smart card into the DES decryption circuitry is achieved by way of a security chip (SC) 524 which receives an encrypted version of the CW from the smart card. Alternatively, data packets encrypted by the HE 102 using AES encryption may be decrypted using an AES decryption circuit 525.

To allow additional encryption to be applied to the received broadcast encrypted data packets prior to storage on the HDD 425, the example IRD 110 of FIG. 5 includes an AES encryption circuit 527 that optionally applies additional encryption to the received encrypted data packets. In general, the received encrypted data packets are the same encrypted packets created by the HE 102 and transmitted via the satellites 106, 108 and/or made available for download via the CDN 120. To decode additionally encrypted data stored on the HDD 425, the illustrated example includes a second AES decryption circuit 528. Alternatively, the AES decryption circuit 525 could be multiplexed to perform the decrypting operations implemented by the decrypters 525 and 528. An example encryption configuration is discussed below in connection with FIG. 6. The use of additional decryption for use in the reception of additionally encrypted assets from a CDN 120 is discussed below. The additional encryption and/or decryption may also be used to implement secure delivery of assets between the IRD 110 and devices 114 such as media players communicatively coupled to the example IRD 110.

The authorized and decrypted data of interest, which now consists of, for example, encoded audio/video data, are, for example, forwarded to decoder dynamic random access memory (DRAM) for buffering (not shown). The display module 530 and/or the audio module 535, using any of a variety of techniques and/or methods, decode the received encoded audio/video data, as needed. For example, a video decoder 532 reads the encoded video data, parses it, obtains quantized frequency domain coefficients, and then performs an inverse quantization, an inverse discrete cosine transform (DCT) and motion compensation. At this point, an image is reconstructed in the spatial domain and stored in a frame buffer (not shown). At a later time, the image is read out of the frame buffer and passed to an encoder 534. Alternatively or additionally, the display module 530 may generate graphics that allow, for example, an electronic program guide to be displayed. The video encoder 534 may convert the digital video signals to, for example, an analog signal according to the NTSC standard or to another desired output protocol (e.g., a protocol defined by the ATSC), thereby allowing video to be received by the display device 138 (FIG. 4) via the A/V output module 540. Alternatively, received data may be used by the controller module 505 to, for instance, configure the receiver (e.g., software downloads and/or updates), present program guide information, etc.

To communicatively couple the example IRD 110 to an HE 102 and/or a CDN 120, the illustrated example interface module 550 includes a network interface 435 and/or a conventional modem 551. In the example of FIG. 5, the network interface 435 implements an Ethernet interface and couples the example IRD 110 to an HE 102 and a CDN 120 via the Internet 122 (FIG. 1) and optionally to one more clients 114 and/or media players 114 via a home network 116. For example, the network interface 435 may be connected to a router (not shown) that provides connectivity between the IRD 110 and devices 114 connected to a home network and provides a bridge to a broadband modem (e.g., an ADSL modem) (not shown) that connects the IRD 110 to the Internet 122. The IRD 110 may, additionally or alternatively, be connected to devices 114 via a USB interface 552, a serial port interface 553, a Firewire interface (not shown), etc. that also may be implemented by the interface module 550.

To receive inputs and provide outputs, the illustrated example IRD 110 includes the front panel module 560 that provides an interface between the controller module 505 and a plurality of input and/or output devices (e.g., devices 562, 564, 566 and 568). To read and/or write data to any of a variety of smart cards, the example IRD 110 includes the smart card reader 562. To receive user inputs and/or selections from a remote control, the IRD 110 includes an infrared (IR) receiver 564. In addition, support for an RF remote control, e.g. that uses UHF frequencies instead of IR frequencies, may be offered through an RF receiver module (not shown). A user may also provide inputs and/or control the example IRD 110 via one or more buttons (e.g., power on/off, play, etc.) 566 physically located on the IRD 110. To provide user prompts, status, date, time, etc. information to a user, the illustrated example includes any of a variety of display devices 568, for example, a liquid crystal display (LCD).

The controller module 505 may be implemented using any of a variety of techniques, devices, components and/or circuits. An example controller module 505 includes one of any variety of microprocessors, processors, controllers, CPUs 507, an electronically erasable programmable read only memory (EEPROM) 508 and flash memory 509 to store, for example, machine readable instructions that may be executed by the CPU 507, a static random access memory (SRAM) 506 to store data and/or variables used and/or accessed by the CPU 507, or other memory.

Reception of content (i.e., assets) by downloading them from a CDN 120 may be performed by the example IRD 110 of FIG. 5 using any of a variety of techniques. For example, reception and/or recording of an asset may be performed via an IP socket. In particular, based on information from APG data (e.g., an Internet URL), a connection to the CDN 120 is established over which a stream of IP packets may be received. The stream of packets is processed by an IP stack executing, for example, on the CPU 507 and/or the network interface 435 and then passed onto the transport module 520. The transport module 520 processes the data in a substantially similar manner as data received from the front end modules 510 are processed.

Assets and/or programs received via the satellites 106, 108 include a program clock reference (PCR) that may be used by the transport module 520, the display module 530 and/or the audio module 535 during playback of the received assets and/or programs. Assets and/or programs received from a CDN 120 do not include a PCR and, thus, the IRD 110 assumes the PCR is running exactly at 27 MHz and therefore runs its internal clock 580 at its default frequency. Like assets and/or programs received via the satellites 106, 108, for assets received via the CDN 120, the display module 530 and/or the audio module 535 use presentation time stamps (PTS) to maintain appropriate frame rates and to established audio and video synchronization. In particular, the IRD 110 uses the first PTS encountered to set the phase of the clock 580.

Figure 6:
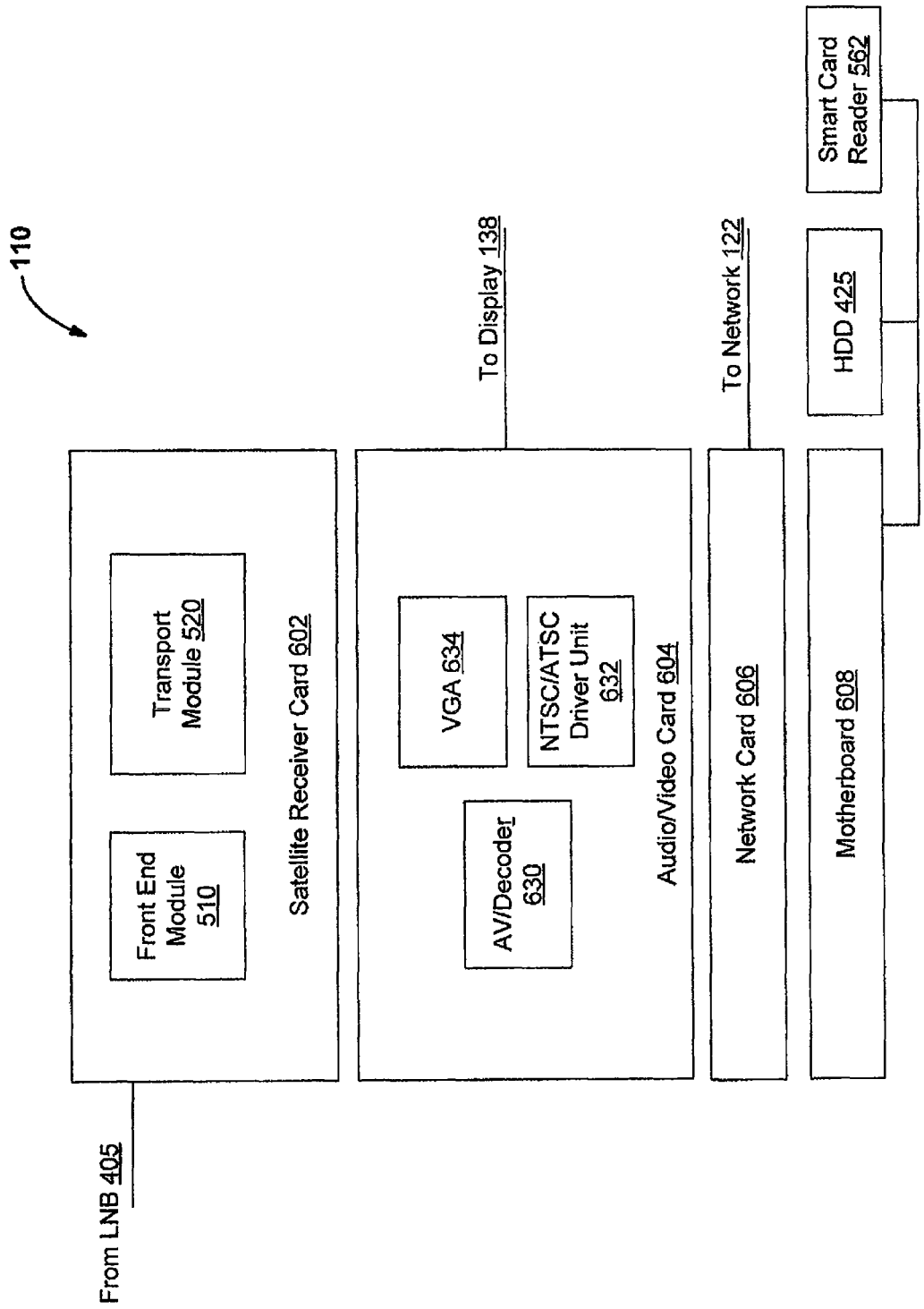

FIG. 6 is a detailed illustration of a third example IRD 110 having a personal computer (PC) based architecture, it being understood that the example IRD 110 of FIG. 6 could be used in the example DTH system 100 of FIG. 1. As shown, the example IRD 110 of FIG. 6, which receives an input from the LNB 405, includes any variety of satellite receiver card(s) 602, any variety of audio/video card(s) 604 and any variety of network card(s) 606, each of which may be coupled to a motherboard 608. The video/audio decoder card 630 could, of course, be integrated with the satellite receiver card 602 and the network card 606 may be integrated into the motherboard 608. The IRD 110 also includes any variety of smart card reader(s) 562 and any variety of HDD(s) 425 that may be coupled to the motherboard 608 or integrated with the cards 602, 604 and/or 606.

In one example, the satellite receiver card 602 includes a front end module 510 and a transport module 520. The implementation and/or interconnection of these devices are substantially the same as shown and described in conjunction with FIG. 5 and, thus, in the interest of brevity will not be repeated here. The interested reader is referred to the discussion above in connection with FIG. 5.

The audio/video decoder card 604 includes an audio/video decoder 630, an optional NTSC and/or ATSC output driver 632 and a video graphics adapter (VGA) output driver 634. As described below in detail, the satellite receiver card 602 can receive and the audio/video card 604 can decode the signal received from the LNB 405.

In operation, an incoming signal from the LNB 405 is received by the satellite receiver card 602 and passed through a series of initial processing operations including the front end module 510 and the transport module 520. Although the functional circuits within the transport module 520 are not illustrated, they may, for example, be identical to those described above in connection with FIG. 5. For example, the transport module 520 receives the transport stream or bitstream of digitized data packets containing video, audio, scheduling information, and other data. The digital packet information contains identifying headers as part of its overhead data. Under control of a main processor/controller (typically located on the motherboard 608), the transport module 520 filters out received data packets that are not currently of interest. Received data packets that are of interest are routed through decryption within the transport module 520. Received data packets may also be additionally encrypted and stored, for example, by the motherboard 608 on the HDD 425.

The transport module 520 passes the data to the audio/video decoder 630 of the video/audio decoder card 604. The authorized data of interest are stored in system RAM (not shown) for buffering, and the video/audio decoder 630 retrieves the data from RAM as needed. For video data, the audio/video decoder 630 reads in the encoded video data from its RAM, and, using any of a variety of techniques and/or methods, decodes the encoded video data and stores the resulting video data in a frame buffer in the video decoder's RAM. At a later time, the image may be read out of the frame buffer and passed through the display circuitry to the VGA output driver 634 and optionally, to the NTSC and/or ATSC output driver 632, the output of which may be coupled to the display device 138. The display circuitry may also generate graphics and text for a graphical user interface (GUI), such as an electronic program guide, to be displayed.

Although not shown, any one or more of the cards 602-608 may include one or more processors to execute machine readable instructions that may be used to implement the example methods, processes, apparatus, and/or systems described herein. Also, the allocation of memory and control functions may be arbitrarily divided between the cards 602-608 of the example IRD 110 of FIG. 6. Thus, a substantial amount, or possibly all, of the control and memory functions for operation of the disclosed system may be integrated within a single card, or alternatively, may be incorporated within the PC motherboard 608. Network card 606 may couple the IRD 110 to a network 122 or to other IRDs.

Although the example IRDs 110a-110n illustrated in FIGS. 4, 5 and 6 are shown as having a plurality of components, circuits and/or devices that are interconnected or communicatively coupled with other components, circuits and/or devices, such interconnections are illustrated by way of example and should not be construed as limiting the manner in which they can be interconnected to implement the example methods, apparatus, and/or systems described herein. On the contrary, the components, circuits and/or devices described above in connection with the illustrated examples of FIGS. 4-6 may be interconnected in any other suitable manner to implement the example methods, apparatus, and/or systems.

In the illustrated example system 100, the HDD 425 of the example IRDs 110a-110n of FIGS. 4-6 is partitioned into at least two partitions. A first network partition is used to store content (e.g., assets) "pushed" by the HE 102 to the IRDs 110a-110n via the satellites 106, 108. Such pushed content is received and stored by the IRDs 110a-110n without being selected and/or requested by a user of an IRD 110. A second user partition is used to store content requested and/or selected by the user and received via the satellites 106, 108 and/or downloaded via a CDN 120. A content request could be for a specific program or for a specific category of programs meeting any number of criteria, e.g. genre, actor name.

As discussed above, the example IRDs 110a-110n of FIGS. 4-6 are able to receive, decode and playback both live programs and non-live programs. Live programs received by an IRD 110 may be recorded by the IRD 110 to the HDD 425 and/or may be directly decoded and played back to a display device 420138. In general, non-live programs are received and first stored in their entirety on the HDD 425 before being subsequently decoded and/or played back. Alternatively, a non-live asset may be directly decoded and/or played back if it is received by the IRD 110 at a rate exceeding the playback rate of the asset. As also discussed above, live and non-live programs may be recorded, stored, decoded, played back and/or otherwise manipulated identically by the IRDs 110a-110n. In particular, all assets are stored on the HDD 425 using a single file format.

In the example IRDs 110a-110n of FIGS. 4-5, reception and/or recording of live data selected by the user will, in general, have a higher priority than the reception and/or recording of non-live data. For example, an IRD 110 will be able to interrupt (e.g., pause) the download of an asset from a CDN 120 to ensure that a live program is received, recorded and/or played back in its entirety and without interruption. Once the conflict is over, the IRD 110 may resume downloading and/or reception of the non-live asset.

Since the example IRDs 110*a*-110*n* of FIGS. 4-6 include a connection to the Internet 122, the example IRDs preferably use the Internet connection via the network interface 435 for back channel communications, callbacks to the HE 102 or to form peer-to-peer networks. Further, since Internet connections are typically higher speed and always on, the Internet connection may be more suitable for interactive applications, gaming, ratings measurement, etc.

The example IRDs 110*a*-110*n* illustrated in FIGS. 4-6 may be implemented in a same housing or in different housings. For example, an IRD 110 may be implemented in a single housing as a set-top box (STB), a DVR, an HMC and/or a PC. Another example IRD 110 comprises a first housing that includes the front end module 510 and a PC (i.e., second housing) implementing the other portions of the example IRD 110. In this event, the content delivered from one housing to the other would be protected, e.g. using data encryption techniques.

Figure 7:
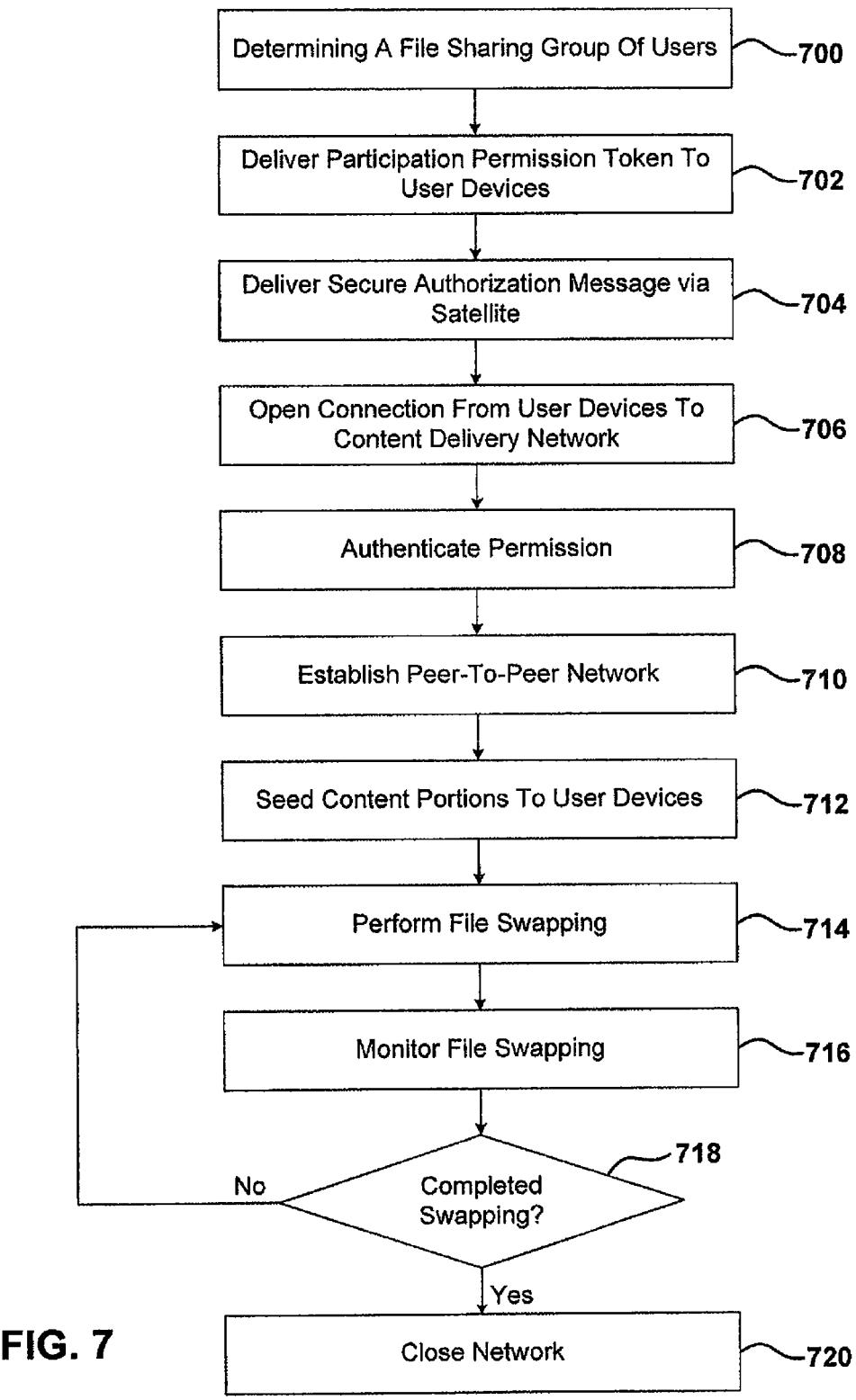
FIG. 7 is a flowchart illustrating a first method for operating the present disclosure.

Referring now to FIG. 7, a method of delivering content to a plurality of user devices is set forth. In this method, a peer-to-peer network may be established so that content may be delivered thereby. After the proper authorizations and securities are in place, the peer-to-peer network may be formed and file portion transferring may take place between the members of the peer-to-peer network. The present method has two significant applications. One is for subscribers who automatically record the same program or content on a regular basis. Another use for the method set forth in FIG. 7 is for a specialized group, such as a corporation, that uses private-network channels that can be viewed using special authorization.

In step 700, a file-sharing group of user devices is determined. The group of user devices may be a group of user devices less than all of the subscribers in a particular network. The group of user devices may share a common trait such as belonging to the same pay or premium service. At minimum, the group of user devices is a group of users from all of the users that desire to download or record the same content.

In step 702, participation permission, such as a participation permission token, is transferred to each of the user devices. A participation permission token may be communicated in a participation signal and may include a secure token, a URL, a password, or a signed request that must be verified by a central server as a condition for participation in the file swapping or sharing. The permission token may be delivered by the satellite, the Internet connection or an Ethernet connection. The permission token may be delivered to all of the subscribers of a pay TV broadband service or may be limited to a subset of subscribers that are authorized to receive the specific service or file. The signal or token is stored in each of the user devices.

In step 704, a secure authorization message signal may be delivered by way of the satellite to the group of devices. The authorization message may comprise a secure conditional access packet (CAP) requesting the user device to schedule or open an Internet connection. The request which generates the CAP is scheduled by the broadcast system. The CAP may be delivered to the specific number of users or may be addressed to a group of users which subscribe to the service and have requested the same files.

In step 706, a connection from the user devices to the content delivery network is initiated. In step 708, the permission is authenticated. The permission was received in step 702. Authenticating the permission may take place at the head end, content delivery network, server or authentication server. In step 710, a peer-to-peer network is established once the permission is authenticated in step 708. In step 712, the content distribution network may be used to seed various content portions to the user devices. That is, the content or file to be downloaded may be divided into several content portions that are provided to various user devices. At this stage, each of the user devices does not include the complete content file or content.

In step 714, file sharing or swapping is performed once the content portions are seeded to the various users. File swapping is performed using the peer-to-peer network established above. In step 716, the file sharing may be monitored by the content distribution network. If an irregularity in the system takes place, the file swapping may be ended. The content distribution network may also be used to monitor when file or content transfer is complete. In step 718, if the file swapping is not complete, step 714 continues to be executed until the file swapping is completed. If the file swapping is completed, the central network closes down the network in step 720. Also, the closing of the network may include the closing of the Internet connection at the various user devices. It should be noted that the Internet connection may be an Ethernet connection or the like.

Figure 8:
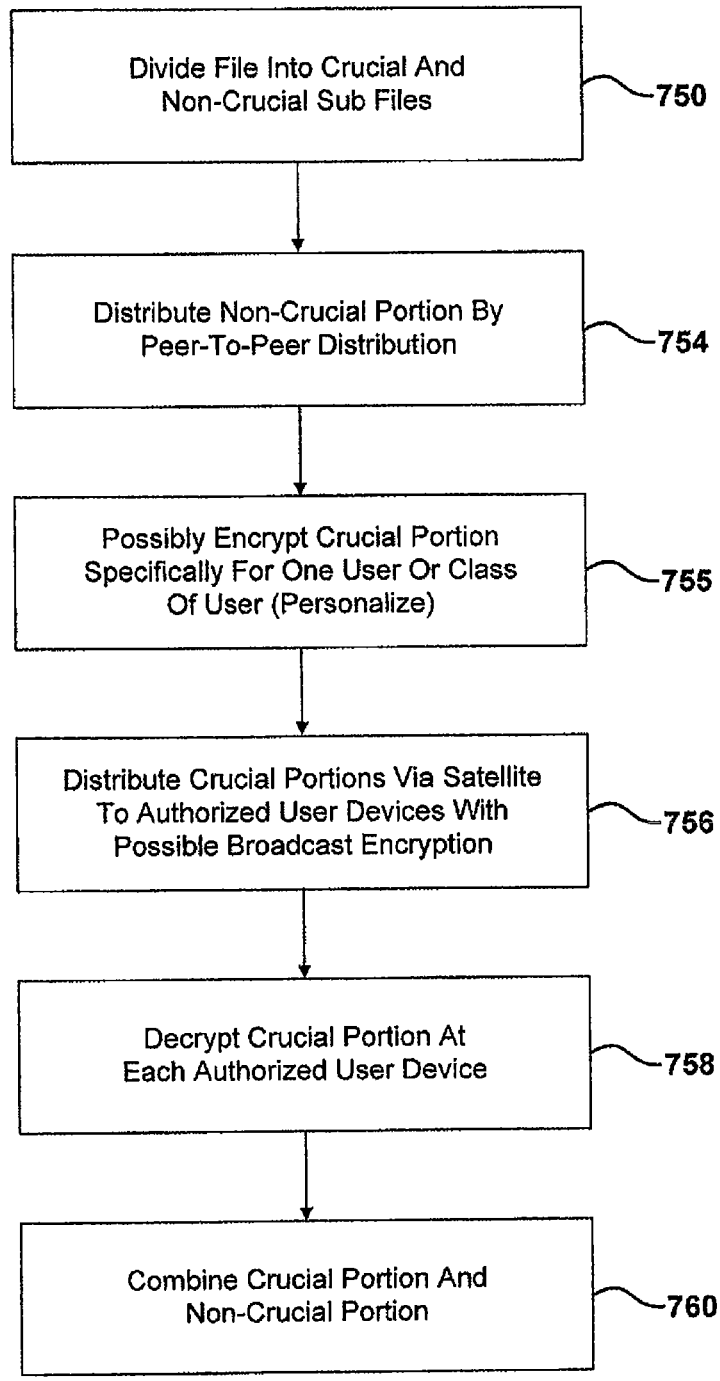
FIG. 8 is a flowchart illustrating a second method for operating the present disclosure.

Referring now to FIG. 8, a method for using a peer-to-peer network for file swapping is set forth. In this embodiment, the content file to be distributed is divided into crucial and non-crucial subfiles or portions. The crucial portions comprise data without which the remaining file cannot be assembled or used or cannot be rendered without significant degradation. The crucial portions may include, for example, the I-frames in an MPEG2 format signal. Other types of crucial portions may also be used. The crucial portion will be referred to in the singular, although more than one may be used. The crucial portion may be distributed in the same manner or a different manner than the non-crucial portions. The method of FIG. 8 may be performed when the content file is intended for only certain user devices in a group of user devices.

Large portions of the file may be sent out as non-crucial portions, using unrestricted peer-to-peer file sharing (e.g. via a broadband network). However, the crucial portion of the file may be sent out in a manner that restricts the reception of the crucial portion to a subset of user devices that are entitled to receive the entire content file, and only these users will be able to reconstruct and use the original content file. For example, the crucial portion may be broadcast by satellite, thereby restricting use of the content files to user devices that can receive the crucial portion via satellite, as well as the non-crucial portion via peer-to-peer broadband content sharing.

The content file may be further restricted (e.g. to users that subscribe to a premium subscription service or that subscribe to a broadband VOD service) by using a satellite broadcast encryption of the crucial portion that restricts reception and decryption of the crucial portion to satellite receivers that have access to the required subscription service. The content file may be further restricted and personalized (e.g. to customers that have ordered the content file on a pay-per-view basis) by encrypting the crucial portion for the specific user or class of users.

In step 750, the content file is divided into crucial and non-crucial portions. In step 754, the non-crucial portions may be distributed by peer-to-peer distribution. That is, the distribution may take place in a seeding manner like that described above in FIG. 7. A peer-to-peer network for use in peer-to-peer distribution may be established in a similar manner to that described above in FIG. 7. That is, participation permissions and secure authorizations may be used to establish the peer-to-peer network. The present method may also be used without permissions or authorizations, allowing an unrestricted peer-to-peer distribution of the non-crucial portion.

In step 755, the crucial portion may be encrypted specifically for each user or for a class of user. In this manner, the crucial portions may be personalized. The present method may also be used without the personalization of the crucial portion subfile.

In step 756, crucial portions are distributed to each user device. The crucial portions may be distributed by satellite whereas the non-crucial portions may be distributed by the peer-to-peer network in step 754. The crucial portions may use the same broadcast encryption as regular satellite content packets to restrict access to these crucial portions. For example, broadcast encryption and the use of control word packets for conditional access may be used. In step 758, the crucial portions are received and decrypted at each user device. This decryption may include decryption of the broadcast encryption by authorized devices. As mentioned above, the encryption may also be performed in a personalized manner, whereby each user device has special encryption to decrypt its own crucial portion. That is, if a crucial portion is received by a user device that it is not intended for, decryption may not take place. Also, if encryption of the crucial portion is used for personalization, the combination of the crucial portion with the non-crucial portions in a device other than the intended device for the crucial portion may result in an unusable content file.

In step 760, the crucial portion and non-crucial portion are assembled. It should be noted above that several crucial portions may be distributed. However, in the above example one crucial portion and several non-crucial portions were communicated. The reassembled content may then be used by the user device. The failure to receive or decrypt the crucial portion, such as by an unauthorized device or a device other than an intended device, will result in an unusable content file.

Figure 9:
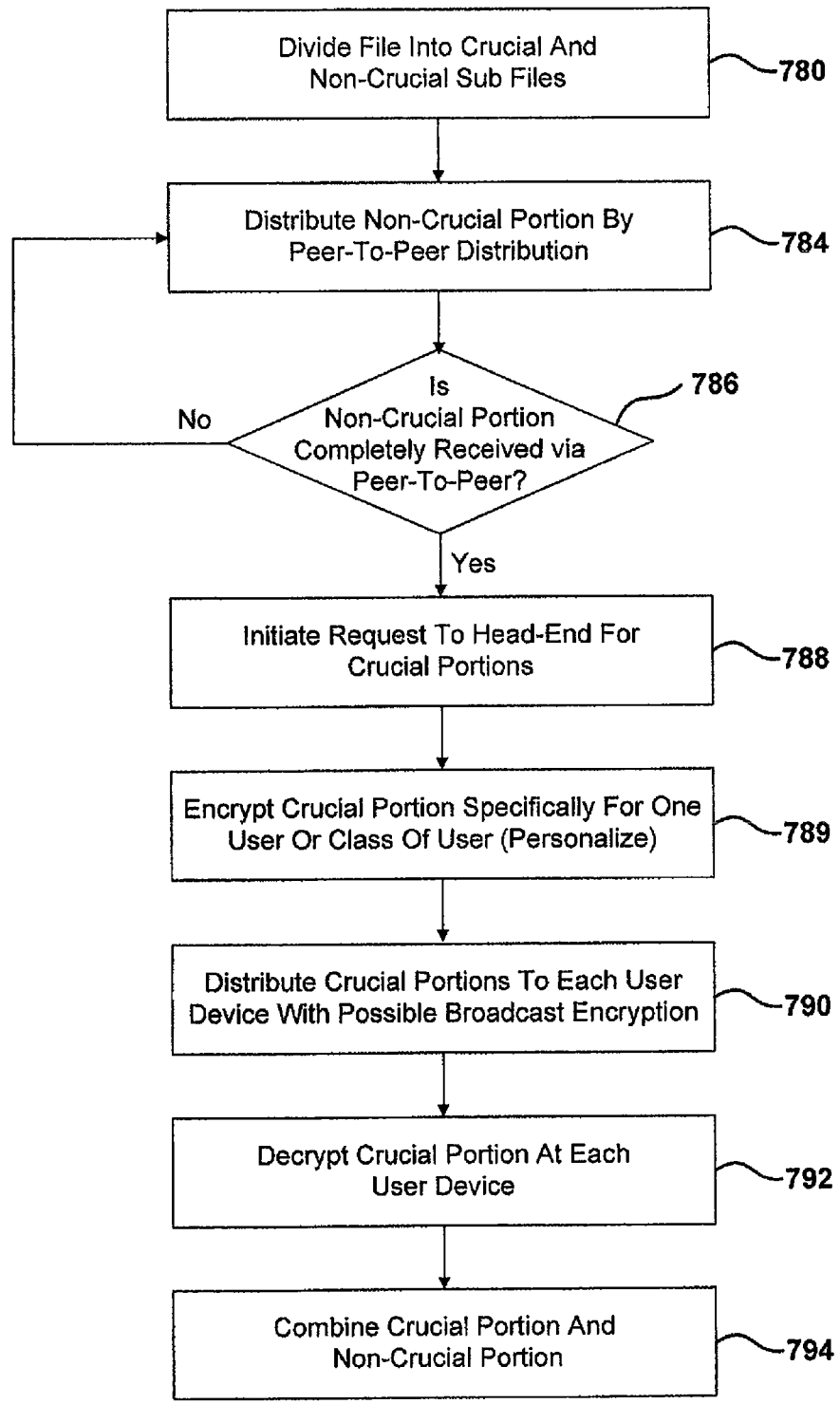
FIG. 9 is a flowchart illustrating a third method for operating the present disclosure.

Referring now to FIG. 9, another method for using a peer-to-peer network is set forth. In this example, the files may be broken up into crucial and non-crucial portions as set forth above in FIG. 8. However, in this example, the crucial portion is not broadcast or provided until all the non-crucial portions are provided. The crucial portion may be provided to a user device after all non-crucial portions have been received by that user device using peer-to-peer sharing. The crucial portion may only be provided to such devices that are authorized to receive the full content file. Also, in this example, the establishing of a peer-to-peer network and establishing authorizations in steps 700-710 as set forth in FIG. 7 may be utilized and thus is not repeated.

In step 780, the file or content is divided into crucial and non-crucial subfiles in a similar manner to that set forth above with respect to step 750. In step 784, non-crucial portions are distributed by peer-to-peer distribution. After step 784, step 786 determines whether the non-crucial portions have been completely received by the peer-to-peer network. As mentioned above, the peer-to-peer network may be seeded with various non-crucial portions and thereafter the non-crucial portions may be exchanged using the peer-to-peer network. If the non-crucial portions have not completely been received via the peer-to-peer network, step 784 is again executed.

In step 786, if the non-crucial portions have been completely received by a user device via a peer-to-peer network, and that user desires access to the content file, in step 788 the user initiates a request to the head end for the crucial portions. The crucial portion request may be made by way of the Internet 122 through a broadband connection. Also, other wireless or direct connections such as a telephone or other content delivery network connection may also be used to make the request. A satellite could also be used to make the request for the crucial portion.

In step 789, the crucial portions may be specifically encrypted for one user or a particular class of user (for example after receiving requests from a number of users). In step 790, the crucial portions may be distributed to each user device. The crucial portion may be distributed in a different manner or the same manner that the non-crucial portions are distributed. For example, the crucial portions may be distributed via satellite, or the crucial portion may be distributed through the Internet. However, even when distributed through the internet, the crucial portions may also be distributed in a more secure manner using the encryption provided other files over a satellite. For example, broadcast encryption and the use of control word packets for conditional access may be used to restrict access to these crucial portions. In step 792, the crucial portions are decrypted should encryption be used. The decryption takes place at each user device. This decryption may include decryption of the broadcast encryption by authorized devices. In step 794, the crucial portions and non-crucial portions are combined at each of the user devices. If personalization is used, even crucial portions used with non-crucial portions may not form a usable file at a user device. Thus, a particular crucial portion must be used together with non-crucial portions for a particular user device for the content file to be usable. The failure to receive or decrypt the crucial portion, such as by an unauthorized device or a device other than an intended device, will result in an unusable content file.

Figure 10:
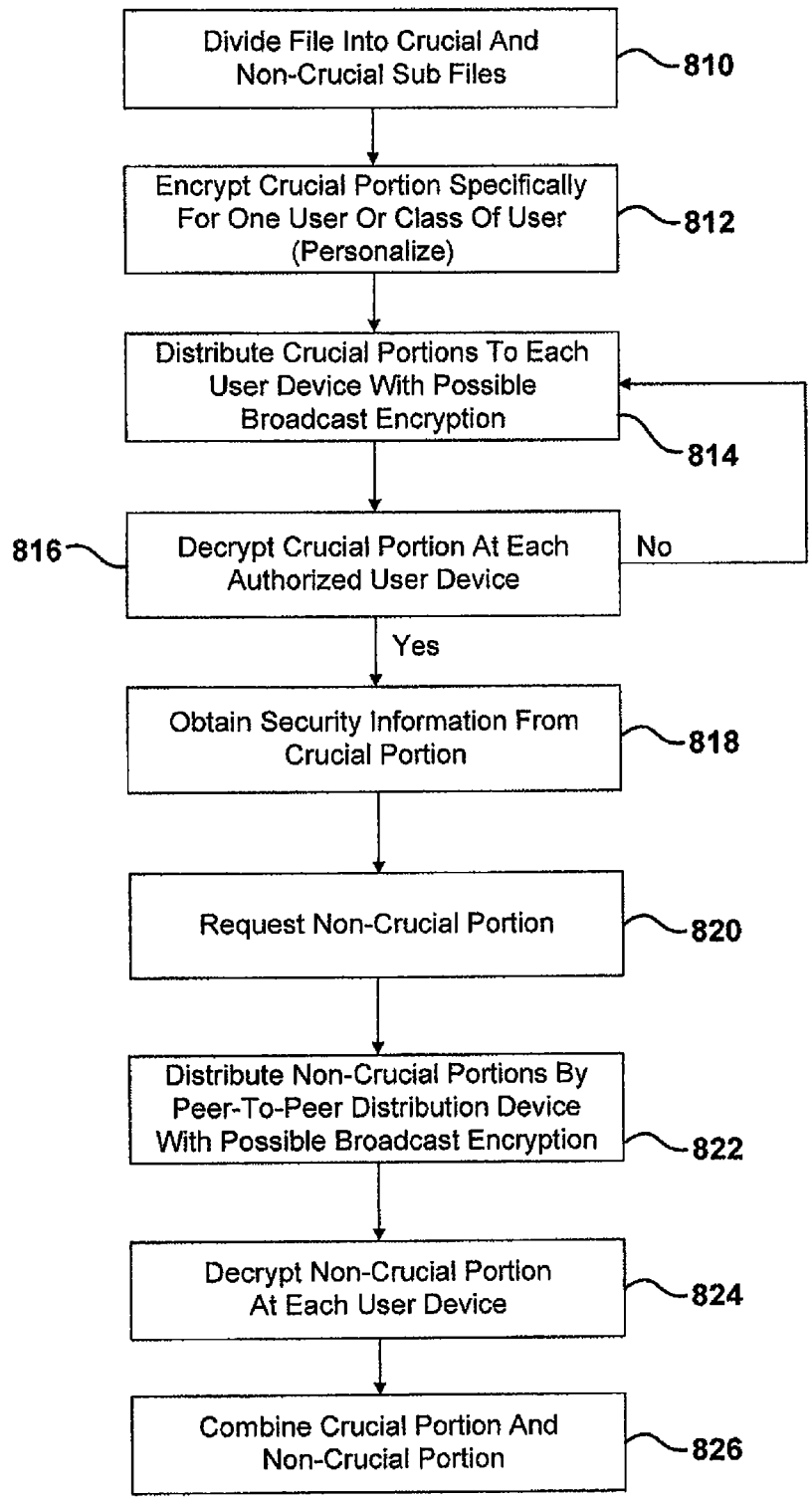
FIG. 10 is a flowchart illustrating a fourth method for operating the present disclosure.

Referring now to FIG. 10, an alternative embodiment to that described above with respect to FIG. 9 is illustrated. In this embodiment, the content files are again broken into crucial and non-crucial portions but the crucial portion is distributed first and security information is obtained from the crucial portion where, thereafter, the non-crucial portions are distributed by peer-to-peer distribution. Again, the teachings in FIG. 7 steps 700-710 may be utilized and thus are not repeated. It should be understood that the peer-to-peer file sharing of non-crucial portions can proceed as soon as one or more requesters have received their crucial portion. As each additional requester receives their crucial portion, they can obtain the participation permissions that enable them to join an existing peer-to-peer network and begin to receive and share non-crucial portions of the content.

In step 810, the file is divided into crucial and non-crucial subfiles or portions. In step 812, the crucial portions may be encrypted specifically for a user or for a class of users. In step 814, the crucial portions are distributed to each user device. This may be performed using the satellite or the Internet and with possible broadcast encryption such as that used in the conditional access system. In step 816, the crucial portions are received and decrypted at each user device. In step 818 the user device obtains security information from the crucial portion and generates a request 820 for the non-crucial portions. The request for the non-crucial portions may take place over the Internet, satellite or other communications network such as the telephone network. The non-crucial portions are distributed in step 822 by peer-to-peer distribution, with possible broadcast encryption. In step 824, the non-crucial portions may be decrypted at the user device if encryption is used on a non-crucial portion. In step 826, the crucial portions and the non-crucial portions are combined to form the content file. Once assembled, the file may be viewed or otherwise utilized.

With respect to the foregoing methods described in FIGS. 8, 9 and 10, it should be noted that regular conditional access encryption may be used on the crucial sub-file to provide maximum security for the system. As mentioned above, conditional access encryption is currently used in DIRECTV® systems. The crucial portion may thus be subject to the conditional access encryption. It should be noted that the non-crucial file may also be encrypted, using a similar conditional access encryption, which may in such a case be less restrictive than the crucial portion. For example, the non-crucial portion may be accessed by any regular subscriber to the DIRECTV® service, while the crucial portion may only be accessed by subscribers to a particular program package. Similarly, for pay-per-view content, the non-crucial portion may be accessed by all DIRECTV® subscribers, while the crucial portion may only be accessed after pay-per-view authorization for the content.

Figure 11:
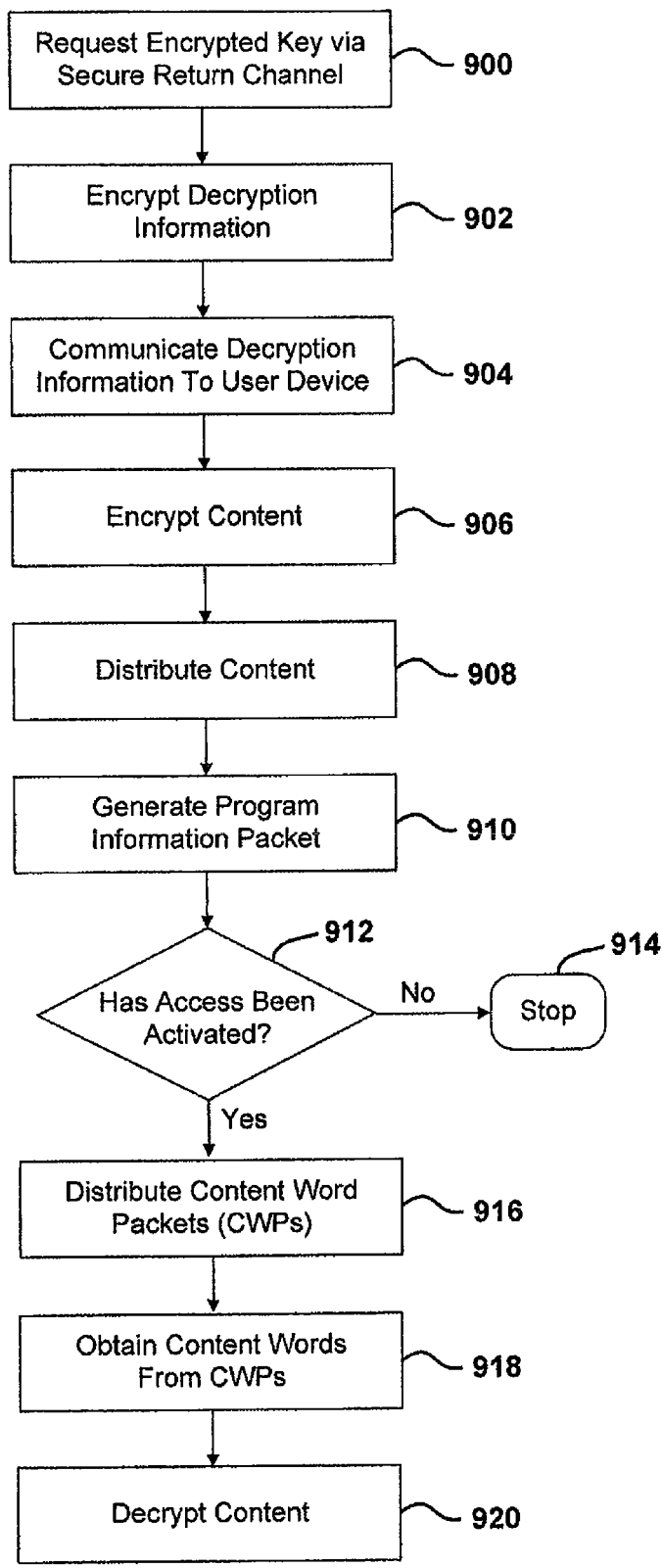
FIG. 11 is a flowchart illustrating a fifth method for operating the present disclosure.

Referring now to FIG. 11, a method for establishing a distribution network is set forth that uses the satellite for distributing encryption-decryption information to the plurality of user devices. The decryption information allows the user devices to decrypt the content based on the encryption applied to the file on transmission. Thus, the information is referred to as encryption-decryption information. In step 900, a request for an encrypted key by a secure return channel is generated. In step 902, the encryption-decryption information may be provided to each of the users. In step 904, the encryption-decryption information is communicated to the user devices by one of a number of various means. For example, the encryption-decryption information may be communicated to the user device by way of satellite. Also, the encryption-decryption information may be provided through the Internet or the like.

In step 906, the content is encrypted. In step 908, the content file or content file portions are distributed. These content files may be distributed using a peer-to-peer network. The content file portions may also be distributed over a satellite connection.

Additional security may also be provided by using the program information packets, control word packets and control words and broadcast encryption, similar to that used for satellite conditional access. In step 910, a program information packet (PIP) is generated and distributed over the satellite or the Internet. In step 912, the conditional access card in the user device uses the PIP to determine whether access to the content is permitted. Content access may be activated by subscription or pay-per-view authorization from the head end, or the user device may obtain impulse-pay-per-view (IPPV) access from the conditional access card. If content access has not been activated, step 914 stops the process.

If the content access has been activated at the set top box, step 916 distributes the control word packets (CWPs) to the set-top-box. Authorization messages for content access may be provided within the CAPs via the satellite. The CWPs may be broadcast over the satellite. The CWPs may also be delivered via the Internet, or may be embedded in a content data stream. If the PIP indicates that access is permitted then the set-top-box may acquire the CWPs for decrypting the content, but if the PIP indicates that access is not permitted, then the CWPs will not be usable by the set-top-box for decrypting content.

In step 918, the control words from the control word packets are determined. The conditional access card may be used to produce the control words from the control word packets. In step 920, the content is decrypted at the user device. The control words are used to decrypt the content. The content may be distributed using a peer-to-peer network, broadband connection, satellite connection, or the like.

It should also be noted that a multi-satellite scenario may also benefit from the present example. The decryption information may be generated or communicated using a primary satellite while the encrypted content may be broadcast over a second satellite, such as a Ka band satellite.

Figure 12:
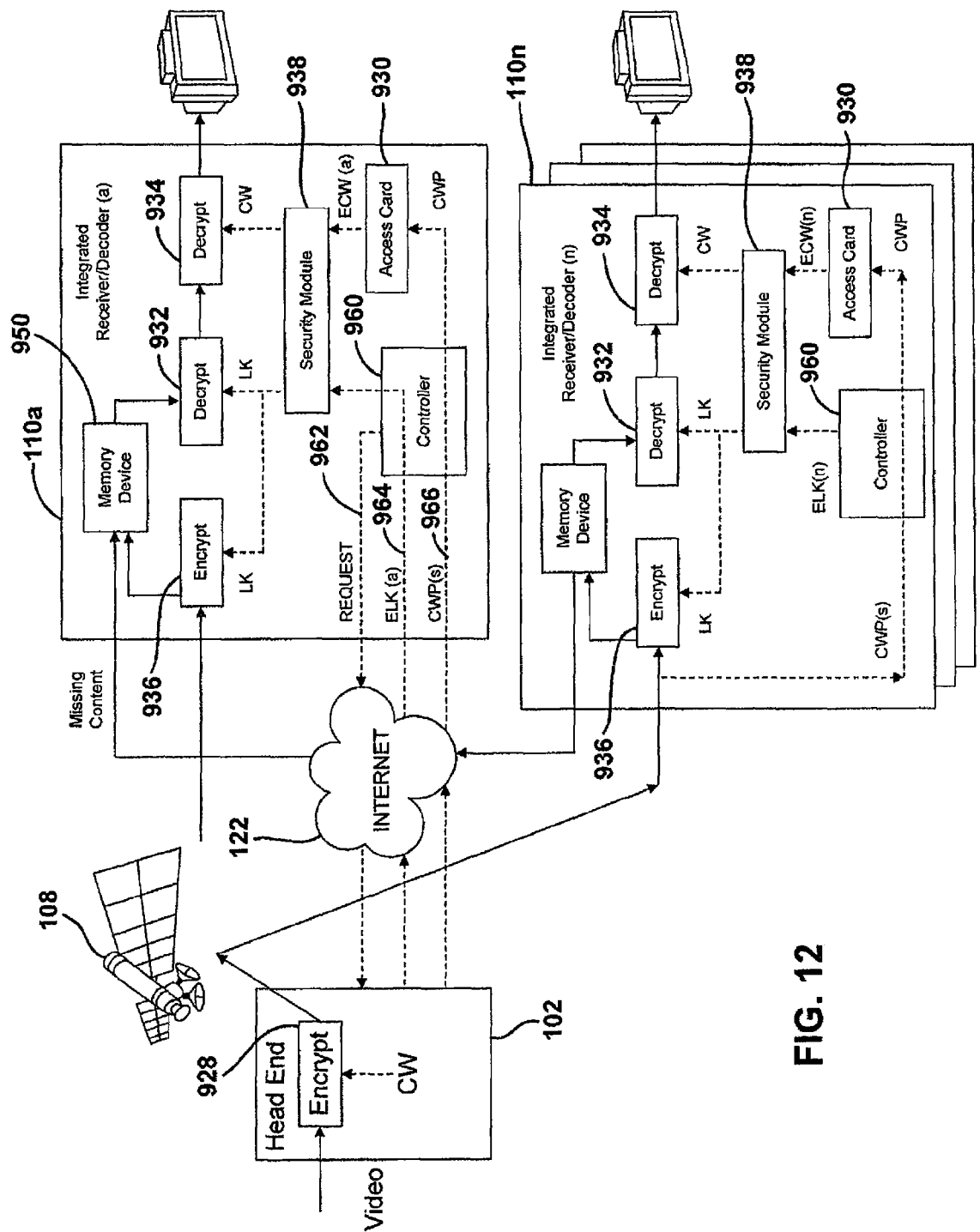
FIG. 12 is a simplified block diagrammatic illustration of an example content delivery system.

Referring now to FIG. 12, a simplified block diagrammatic view of an embodiment for recovering missing segments is illustrated. In this embodiment, a separate encryption module 928 is illustrated in the head end 102. The encryption module 928 receives audio-video signals and control words (CW) and encrypts the audio-video packets using the control words. The headend transmits the control words as control word packets and the audio-video signals as audio-video packets through satellite 108 to the user devices 110*a*-110*n*.

Access cards 930 are used to generate the control word (CWs) from the control word packets. These control words may only be obtained by access cards 930 that are authorized for the desired channels or content. The access cards 930 further encrypt these control words to form encrypted control words (ECWs), where the ECWs may be different for each user device. The user devices 110 may also include decryption modules 932 and 934, an encryption module 936, and a security module 938. The security module 938 decrypts the encrypted control words and provides control words to decryption module 934 so that decryption of the broadcast signal may take place.

When content is received, the encryption module 936 may be used to locally encrypt the signal prior to storage within the memory device 950. A controller 960 may provide encrypted local keys to the security module 938 which may decrypt and provide the local keys to the encryption module 936 and the decryption module 932. The encrypted local keys may be provided from the head end, or may be generated by the controller 960 based on a content identification of the content or the controller may provide the local keys to be encrypted by the security module 938 to form the encrypted local keys.

The controller 960 may also be used to generate various requests and control the operation of the various other modules within the user devices 110*a*-110*n*. For example, if a missing portion of a content file is determined at user device 110*a*, the controller 960 may generate a request 962 so that missing content may be provided through a peer-to-peer network which is illustrated by the user devices 110*a*-110*n*. One or more of the user devices may then communicate the missing content to the requesting user device. The missing content that is communicated may be still be encrypted with the local key from the transmitting user device 110*n*. The decryption module 932 may be used to decrypt the local encryption from the transmitting device. In response to the request 962, an encrypted local key 964 may be communicated to the controller 960 at the requesting device 110*a* so the decryption module 932 may decrypt the content with the local key from the transmitting user device 110*n*. To obtain the correct local key for decrypting the missing content, the security module 938 at the requesting device 110*a* may require a different value of encrypted local key 964 than the transmitting device 110*n*, in which case such encrypted local key 964 may be provided by the head end 102 in response to the request 962.

Broadcast decryption may then take place in the decryption module 934 of the requesting device 110*a* after the local decryption is performed. The broadcast decryption may take place using the control word generated from the security module 938 in response to the encrypted control word from the access card 930. The access card 930 generates the control words (CWs) from control word packets 966 associated with the missing content, where the control words may only be obtained by access cards 930 that are authorized for the missing content. The control word packets 966 associated with the missing content may be provided through the terrestrial network by the transmitting user device 110*n*. These control words packets 966 or the corresponding control words may be further encrypted by the transmitting device 110*n*. The control words may also be provided through the terrestrial network or through the satellite by the head end 102 in response to the request 962.

Various alternative embodiments are also available. For example, the audio-visual content packets and/or the associated control word packets may also be communicated to user devices through a broadband terrestrial network, such as the Internet. In another embodiment, content broadcast from the satellite or received through the Internet may not be locally encrypted at the user devices but may be stored with broadcast encryption only on the memory device. The encryption module 936 and the decryption module 932 may also not be required for such an example. In another embodiment, the broadcast decryption may take place prior to storage within the memory device 950. In such an example, both the encryption module 936 and decryption module 932 may not be employed, and the decryption module 934 may be used to broadcast decrypt the content prior to storage within the memory device 950. As an alternative to this example, broadcast decryption may also take place prior to local encryption. In this example, the decryption module 934 for decrypting local broadcast may be performed upon receiving the signal. Local encryption may then take place using encryption module 936 prior to storing the content in the memory device 950, and local decryption may take place using the decryption module 932 prior to viewing. As can be appreciated, various amounts of encryption and decryption may take place depending on the security level desired for the system.

Figure 13:
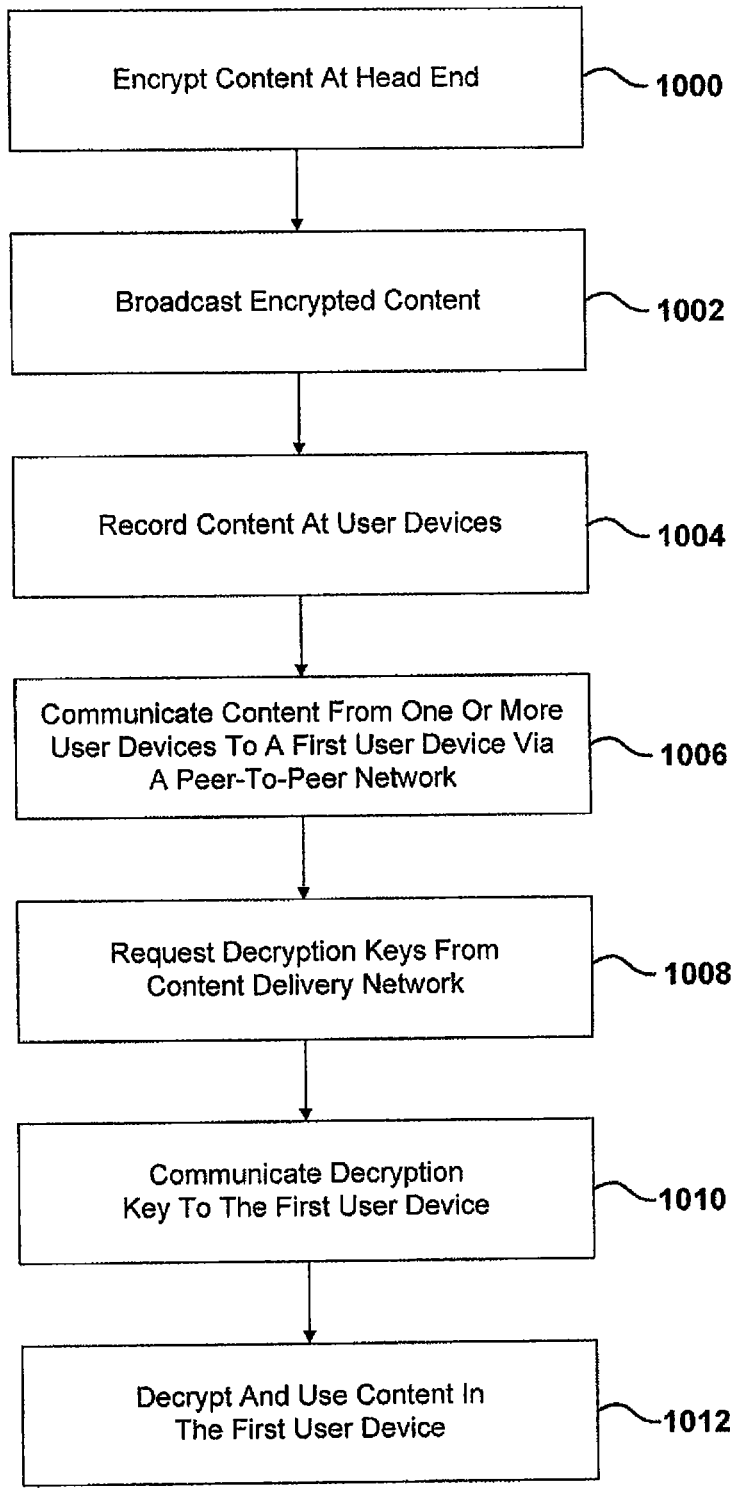
FIG. 13 is a flowchart illustrating a sixth method for operating the present disclosure.

Referring now to FIG. 13, another method for operating the present disclosure is set forth. In this method exchanges of information are performed between various devices. In step 1000, content is encrypted at the head end. In step 1002, the encrypted content is broadcast to a plurality of user devices. The encryption and decryption information associated with the encrypted content used for decrypting the content may be communicated separately from the broadcast-encrypted content. The plurality of user devices stores or records the encrypted content within a memory device within the set top box in step 1004. The memory device may include a digital video recorder implemented in a hard disk drive or discrete memory devices. In step 1006, the content may be communicated from one or more user devices to a first or requesting device using a peer-to-peer network. The content may be an entire content file or a portion of a content file. One specific example of a portion of a content file will be set forth below in FIG. 14. In step 1006, the peer-to-peer network communicates the content from the one or more devices to the first device. A request for the content may be generated to initiate a transfer of content.

In step 1008, a request for decryption keys from the content delivery network may be made by the first device that requested the content in step 1006. A request may be made for decryption keys because in an existing DVR system the content may be stored as broadcast-encrypted content, and may be further encrypted with a unique local key for storage on the hard disk drive within the DVR. The control word packets containing the decryption control words may also be personalized for secure storage on the hard drive within the DVR. The decryption key information from another device, therefore, cannot be made available to others from the peer-to-peer network. When initiating peer-to-peer delivery of content, the recipient may therefore also request a re-send of the local key and relevant control word packets from the head end or the content delivery network.

If the content exchange is authorized by the head end, the control word packets for previously broadcast content may be communicated to the first or requesting user device in step 1010. Further, the head end may communicate the local key that was used at the first user device to encrypt the recorded content. The local key may be received by the head end from the first user device and re-encrypted for delivery to the requesting user device. Each content program may be encrypted by the first device using a different local content key value generated from a content identifier CID and a secret device key. The content identifier and secret device key may also be used at the head end to compute the local content key for delivery to the requesting user device.

The decryption key information from the head end may be communicated by satellite. It may be more useful to communicate the decryption key information through the broadband network, since it is only useful to that one specific user. In step 1012 the content may be decrypted using the received decryption key and used by the requesting user device. The first or requesting user device is capable of providing content to other devices in the peer-to-peer network.

Figure 14:
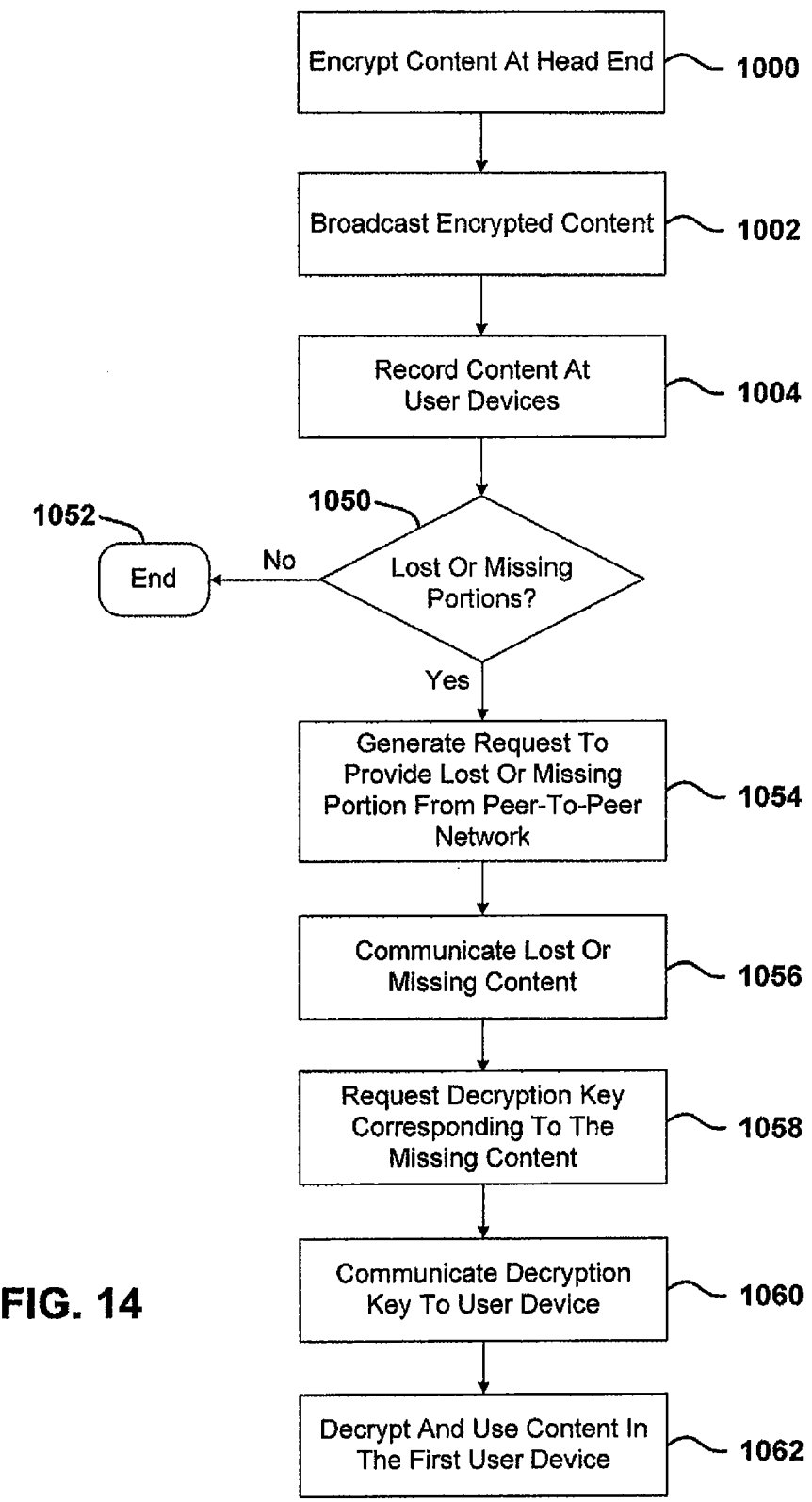
FIG. 14 is a flowchart illustrating a seventh embodiment for operating the present disclosure.

Referring now to FIG. 14, which illustrates a useful embodiment if particular portions of content are lost or missing. For example, if a user device tunes to a broadcast channel when a program is already in progress, the missing beginning portion of the program may be obtained over the peer-to-peer network from other user devices that successfully recorded the program from the beginning. Steps 1000, 1002, and 1004 are identical to those above in FIG. 13. In step 1000, content is encrypted at the head end, in step 1002, the encrypted content is broadcast to a plurality of user devices, and in step 1004 a group of the user devices stores or records the encrypted content. In step 1050, if there are no lost or missing portions at a user device, step 1052 ends the process.

In step 1050, if lost or missing portions of the content are found, step 1054 generates a request from the user device to obtain the lost or missing portions from the peer-to-peer network. In step 1056, at least one of the plurality of user devices communicates the lost or missing content to the user device in response to the request.

In step 1058, the decryption key corresponding to the missing content is requested by the receiving user device. In step 1060, the decryption key is communicated to the user device. As mentioned above, the decryption key may comprise control words for broadcast decryption and local keys for decrypting the local re-encryption or super-encryption at the originating user device. The control words may be communicated to the receiving device by way of control word packets. The local keys may be encrypted uniquely for the receiving user device. As mentioned above, these decryption keys may be communicated by satellite. However, the decryption keys may also be communicated by a broadband terrestrial network since it is directed and usable by only the specific first or requesting user. In step 1062 the requesting user device may decrypt and use the content including playback of the now complete content file.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of delivering a media content file to a first user device separate from a group of user devices comprising:
   receiving an encrypted media content file at each of the group of user devices directly from a satellite;
   receiving a portion of the media content file at the first user device from the satellite;
   communicating a media content file request for a missing portion of the media content file from the first user device to the group through a terrestrial network;
   encrypting the missing portion in response to first encryption-decryption information to form an encrypted missing portion of the media content file;
   second encrypting the encrypted missing portion of the media content file at the group of user devices in response to a second encryption-decryption information to form a second encrypted missing portion of the media content file;
   receiving the encrypted missing portion of the media content file at the first user device from at least one of the group of user devices through a peer-to-peer network;
   requesting, at the first user device, the first encryption-decryption information from a content delivery network through the terrestrial network;
   communicating the first encryption-decryption information from the content delivery network to the first user device through the terrestrial network;
   communicating the second encryption-decryption information to the first user device through the terrestrial network; and
   decrypting the second encrypted missing portion of the media content file at the first user device with the first encryption-decryption information and second encryption-decryption information.

2. The method as recited in claim 1 wherein the missing portion of the media content file comprises a beginning portion of the media content file communicated to the group of user devices through the satellite.

3. The method as recited in claim 1 wherein the media content file is stored in memory at the group of user devices for later viewing.

4. The method as recited in claim 1 wherein the group of user devices comprises a plurality of set top boxes.

5. The method as recited in claim 1 wherein the group of user devices comprises a plurality of satellite set top boxes.

6. The method as recited in claim 1 wherein the terrestrial network comprises a broadband network.

7. The method as recited in claim 1 wherein the peer-to-peer network comprises a broadband network.

8. The method as recited in claim 1 further comprising encrypting the first encryption-decryption information.

9. The method as recited in claim 8 further comprising decrypting the first encryption-decryption information at the first user device.

10. The method as recited in claim 1 further comprising encrypting the first encryption-decryption information at a head end.

11. The method as recited in claim 1 further comprising encrypting the first encryption-decryption information using a conditional access encryption.

12. The method as recited in claim 1 wherein the first encryption-decryption information comprises a broadcast encryption key.

13. The method as recited in claim 1 further comprising encrypting the second encryption-decryption information.

14. The method as recited in claim 13 further comprising decrypting the second encryption-decryption information at the first user device.

15. The method as recited in claim 1 further comprising encrypting the second encryption-decryption information at the group of user devices and wherein communicating the second encryption-decryption information comprises communicating the second encryption-decryption information from at least one of the group of user devices.

16. The method as recited in claim 1 further comprising encrypting the second encryption-decryption information at the content delivery network and wherein communicating the second encryption-decryption information comprises communicating the second encryption-decryption information from at least one of the group of user devices.

17. The method as recited in claim 1 further comprising encrypting the second encryption-decryption information using a conditional access encryption.

18. The method as recited in claim 1 wherein the second encryption-decryption information comprises a local encryption key.

19. A system comprising:
   a first user device; and
   a group of user devices separate from the first user device, said group of user devices receiving a media content file directly through a satellite;
   the group of user devices and the first user device forming a peer-to-peer network;
   the first user device receiving a portion of the media content file directly from the satellite and communicating a content request for a missing portion of the media content file to the group of user devices through a terrestrial network;
   said terrestrial network communicating first encryption-decryption information to the first user device;
   the first user device decrypting the media content file with the first encryption-decryption information;
   the at least one of the group of user devices second encrypting the missing portion of the media content file in response to second encryption-decryption information to form a second encrypted missing portion;
   at least one of the group of user devices communicating the second encrypted missing portion of the media content file corresponding to the content request to the first user device through the peer-to-peer network; and
   the first user device decrypting the second encrypted missing content with the second encryption-decryption information.

20. The system as recited in claim 19 wherein the media content file is stored in memory at the group of user devices for later viewing.

21. The system as recited in claim 19 wherein the missing portion of the media content file comprises a beginning portion of the media content file communicated to the group of user devices through a satellite.

22. The system as recited in claim 19 wherein the group of user devices comprise a plurality of set top boxes.

23. The system as recited in claim 19 wherein the group of user devices comprise a plurality of satellite set top boxes.

24. The system as recited in claim 19 wherein the terrestrial network comprises a broadband network.

25. The system as recited in claim 19 wherein the peer-to-peer network comprises a broadband network.

26. The system as recited in claim 19 further comprising a head end encrypting the first encryption-decryption information.

27. The system as recited in claim 26 further comprising at least one of the group of user devices decrypting the first encryption-decryption information.

28. The system as recited in claim 19 further comprising a head end encrypting the first encryption-decryption information using a conditional access encryption.

29. The system as recited in claim 19 wherein the first encryption-decryption information comprises a broadcast encryption key.

30. The system as recited in claim 29 further comprising a head end encrypting the second encryption-decryption information.

31. The system as recited in claim 30 wherein the first user device decrypts the second encryption-decryption information.

32. The system as recited in claim 29 wherein the terrestrial network communicates the second encryption-decryption information to the first user device.

33. The system as recited in claim 19 wherein the at least one of the group of user devices communicates the second encryption-decryption information to the first user device through a terrestrial network.

* * * * *